United States Patent [19]
Sebald et al.

[11] Patent Number: 4,872,213
[45] Date of Patent: Oct. 3, 1989

[54] VERSATILE INTERFACE MEANS FOR COMPUTER-BASED CONTROL SYSTEMS

[75] Inventors: Mark D. Sebald, Calendonia; Richard E. Neumeyer, Rockford, both of Ill.

[73] Assignee: Barber-Colman Company, Rockford, Ill.

[21] Appl. No.: 175,865

[22] Filed: Mar. 31, 1988

[51] Int. Cl.⁴ .............................................. G05B 9/00
[52] U.S. Cl. .................................... 364/180; 364/184
[58] Field of Search ................................ 364/180, 184

[56] References Cited

U.S. PATENT DOCUMENTS 4,817,022 3/1989 Jornod et al. .................. 364/558 X Primary Examiner—Allen MacDonald
Attorney, Agent, or Firm—Leydig, Voit & Mayer Ltd.

[57] ABSTRACT

A computer implemented control system which includes interface circuitry by which signal intelligence is taken in to the computer from external devices such as sensors and is fed out from the computer to external devices such as actuators which correctively adjust controlled parameters. An interface circuit for each of the several external devices is made "universal" in that either an analog input, bistate input, analog output, or bistate output device may be connected to any given one of the terminal points. A voltage follower amplifier sends the intelligence signal to an output device through a low-cost diode, with negative feedback taken from the downstream side of the diode. When an input device is elected for a given terminal point, simple program editing assures that the diode will be reverse biased to isolate the amplifier from the input signal path. In addition, inaccuracies in the analog output voltage fed to an output device—arising from contact resistances in a separable connector—are drastically reduced by a dual-path separable connector arrangement which provides two independent circuit connections for the output voltage and for negative feedback.

5 Claims, 11 Drawing Sheets

VERSATILE INTERFACE MEANS FOR COMPUTER-BASED CONTROL SYSTEMS

FIELD OF INVENTION AND BACKGROUND

The present invention relates in general to control systems which include and utilize a programmed digital computer. More particularly, the invention pertains to apparatus by which intelligence is taken into a computer from external devices (such as parameter sensors) and by which intelligence is outputted from the computer to external devices (such as condition-influencing actuators).

In control systems of the type mentioned above, a great number of external sensors are often used to feed information into the computer. The computer determines and sends out commands to a large plurality of external actuators and display units. Each external sensor produces a signal which is of one of two types, i.e., either a signal which can vary to take on any value with a predetermined range (often called an analog signal) or a bistate signal which resides at one of two levels (often called an on-off or digital signal). Likewise, each external actuator may be of a type which responds to a variable analog signal or of the type which responds to an on-off digital signal.

For example, in computer based systems for controlling the heating, air conditioning and humidity in the different office regions or zones of a large office building, a temperature sensing device (thermostat) may be located in each individual office, and a humidity sensor might be located in each of several zone ducts through which air is forced by a blower from a central furnace and air conditioner. Some of the thermostats might be of the on-off type in which switch contacts are opened or closed when sensed temperature is above or below the respective set points; others might be of the variable type in which a thermally sensitive resistor exhibits a resistance value that varies with its temperature. The humidistats likewise may be either of the on-off or the variable type. In such building control system, the computer takes in signals from all of the various external sensors and, by rapid iterations through its programmed algorithm of numerical and Boolean calculations, determines which output commands, and the magnitudes thereof, are to be sent to condition-influencing external actuators. Typically, the computer may send output command signals to damper-positioning motors so as to adjust the proportions of the total blower-pumped air sent through the several respective zone ducts, send signals which change the speed of a blower motor, and/or send signals to change the opening of a furnace fuel valve, as well as signals which merely open or close certain valves or turn indicator lamps on or off.

Accordingly, there is a need to interface a whole host of external input devices (e.g. sensors) and external output devices (e.g. actuators) to a central computer which takes intelligence in from the former and sends back intelligence (commands) to the latter. Each external device is either of the variable (analog) or on-off (digital) type; each external device either sends input signals to, or takes output signals from, the computer. While flow of information from or to the several external devices can be achieved by rapid time sharing and multiplexing accomplished through repeated passes (iterations) through the computer's programmed algorithm, there must be a physical connection and a signal path provided for each of the many external devices. It is not unusual for an entire system to employ as many as five hundred external devices.

The interface hardware for such systems thus includes a large number of terminal points to which respective ones of the external devices may be connected. Early in the art, each terminal point was dedicated to coact with one of the four classes of external devices, i.e., (I) an analog output device, (II) a bistate output device, (III) an analog input device, or (IV) a bistate input device. Once the hardware had been manufactured, its lack of flexibility made installation and changes in the field difficult. Standard computer/interface hardware made with sixteen terminal points for each of the four classes, for example, could not be hooked up to accommodate, say twenty-four devices of Class I, twenty-four devices of Class II, plus ten devices of Class III and twelve devices of Class IV. If the control system for a building were modified after the computer and interface hardware had been delivered to the site, that hardware would not always "fit" to a modified mix of the external devices occasioned by last-minute design changes in the building or its heating system.

To overcome such inflexibility, the interface hardware was improved to provide "universal" terminal point interface circuits. That is, the circuitry between the computer and a given terminal point included a digital-to-analog converter, a voltage follower, and a solid state (FET) gate for outputting a dc. voltage to an external device of Class I or II, together with an analog-to-digital converter between the terminal point and the computer for inputting to the computer a digital representation of the voltage produced by an external device of Class III or IV. When, and if, a Class I or II external device was in fact connected to that given terminal point, a hard wiring connection was made in the interface circuit board so that a gating signal was permanently applied to enable the FET gate at all times when the computer was "powered up". When, and if, an external device of Class III or IV was in fact connected to that given terminal point, the hard wiring was omitted so that the gate was never enabled; dc. voltage from the external device could thus be taken into the computer via an analog-to-digital converter (ADC), and that input voltage was isolated from the output of the voltage follower.

Such prior "universal" input/output interface hardware was, however, expensive. Each terminal point circuit necessarily required an FET gate costing on the order of $150 to $200; for sixty-four terminal points, the interface circuit boards were thus burdened with a gate cost on the order of $112 in addition to the cost of providing and wiring in the components to send enabling signals to those gates. The FET gates also had the disadvantage of creating inaccuracies in the analog output voltage in relation to the input voltage fed to the voltage follower.

OBJECTS AND ADVANTAGES OF THE INVENTION

The general aim of the present invention is to provide interfacing between a computer and external devices via terminal points which are not only "universal" in the sense that an external device of any class may be connected to any given point, but which require and use circuit components significantly less in cost.

A related object of the invention is to provide interfacing between a computer and external devices via terminal points such that an external device of any class may be connected to any given terminal point, yet without any change whatever in the physical wiring of the interface hardware. A coordinate objective is to provide such interfacing that enables marrying a given terminal point to any particular class of external device connected thereto simply by a quick and convenient editing of a software program subroutine within the computer's instruction memory.

Another object of the invention is to provide such interfacing by hardware circuits and circuit components which reduce discrepancies or errors between the magnitude of a dc. output voltage, outputted to a Class I external device, in relation to the numerical value of a digitally signaled word in the computer.

Still another object is to provide interfacing hardware which includes a pull-apart connector for separably joining each terminal point to an associated interface circuit and wherein errors in a dc. output voltage due to the inevitable contact resistance of the connector are reduced by several orders of magnitude and made truly negligible even if the contact resistance is unexpectedly quite large.

These and other objects and advantages of the invention will become apparent as the following description proceeds in conjunction with the accompanying drawings.

DESCRIPTION OF DRAWING FIGURES

Figure 12:
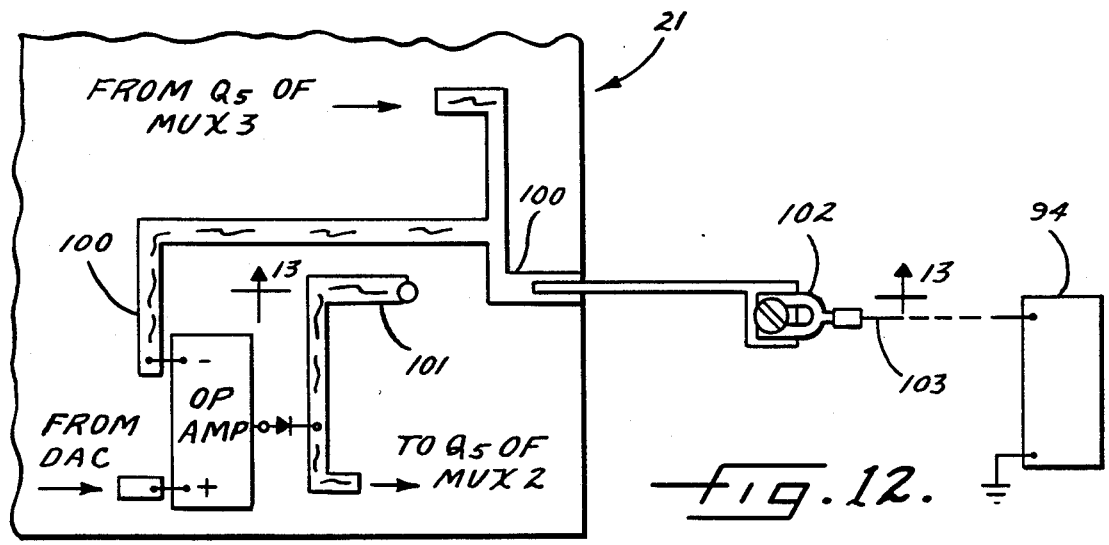
FIG. 12 is a fragmentary view of a printed circuit board and interfacing components, including a separate dual contact pull-apart connector.
Figure 13:
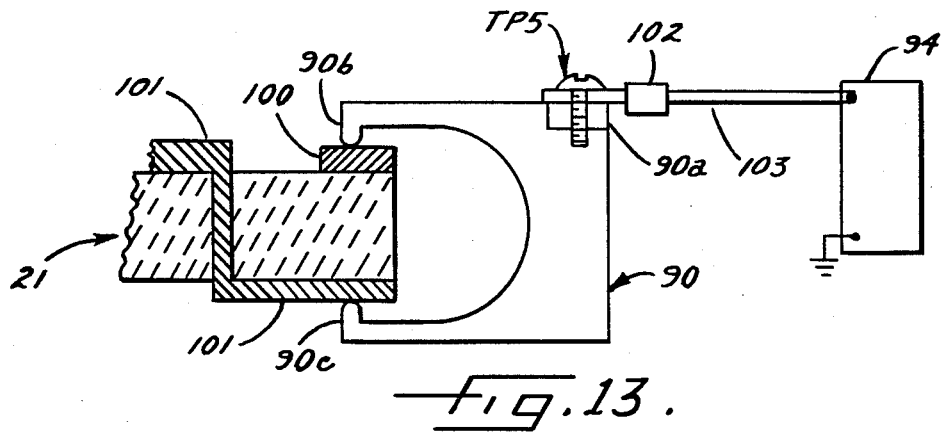
FIG. 13 is a fragmentary section taken substantially along the line 13—13 in FIG. 12.
Figure 14:
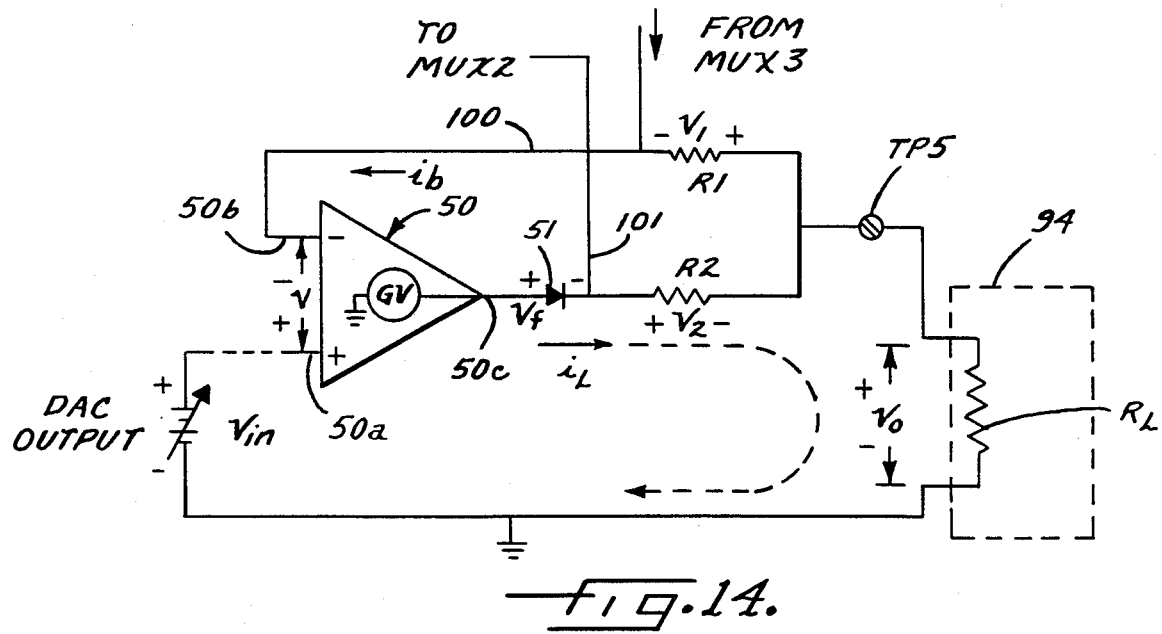
Figure 15:
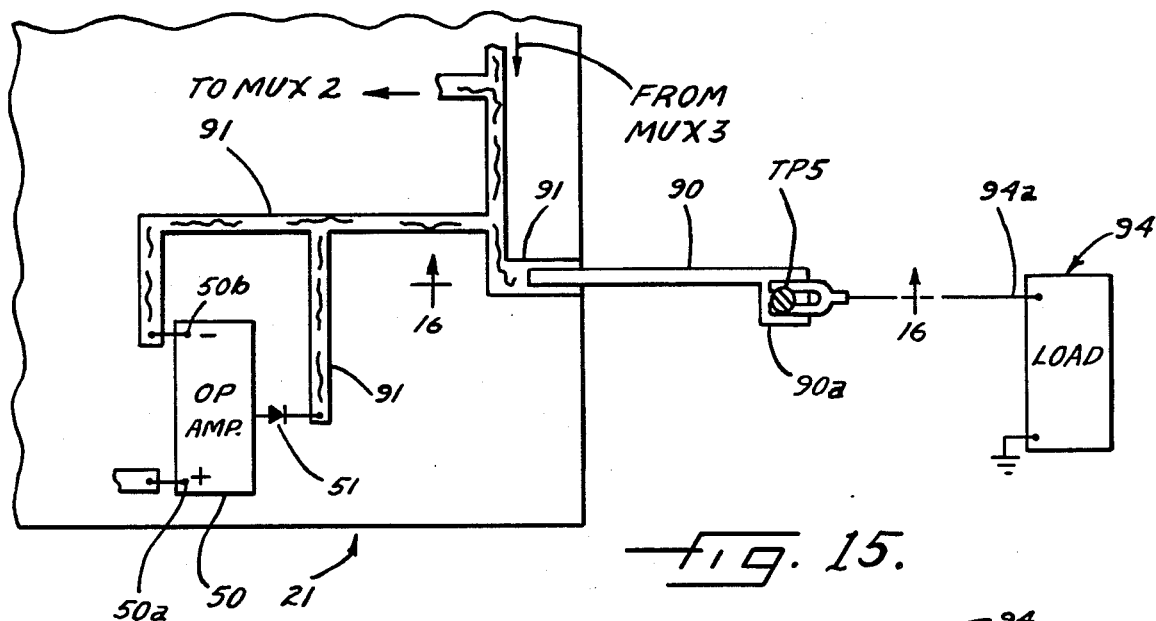
Figure 16:
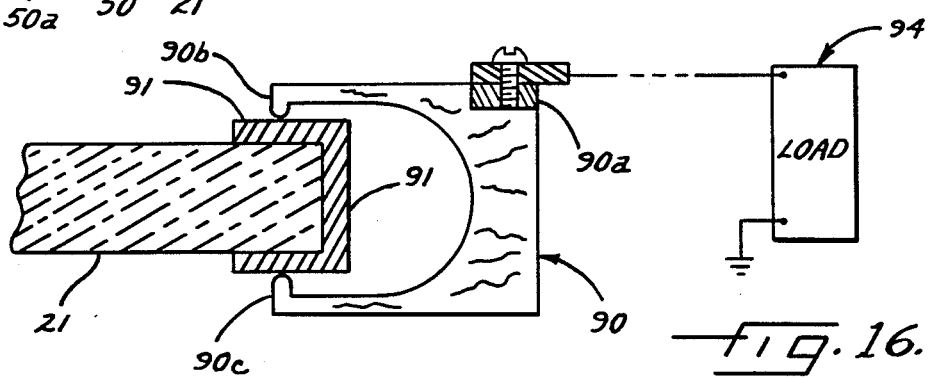
Figure 17:
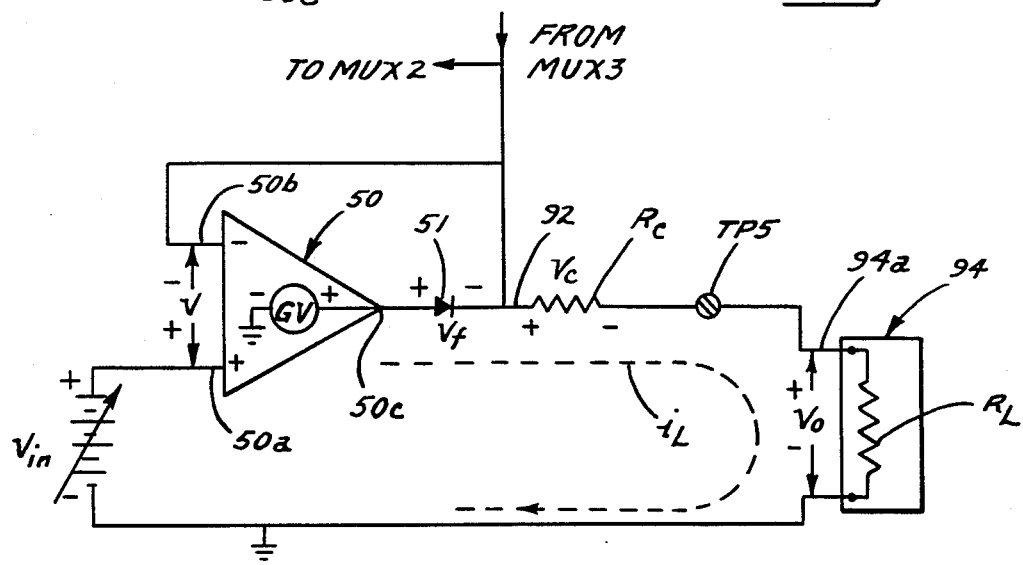

FIG. 14 is an equivalent schematic circuit diagram of the interface circuitry and external device as they appear in FIGS. 12 and 13; and FIGS. 15, 16 and 17 are similar in nature to FIGS. 13, 14 and 15 except that the former show and relate to a conventional single contact pull-apart connector.

DETAILED DESCRIPTION OF EXEMPLARY EMBODIMENTS

While the invention has been shown and will be described in some detail with reference to specific and exemplary embodiments, there is no intention thus to limit the invention to such detail. On the contrary, it is intended here to cover all alternatives, modifications and equivalents which fall within the scope of the appended claims.

Figure 1:
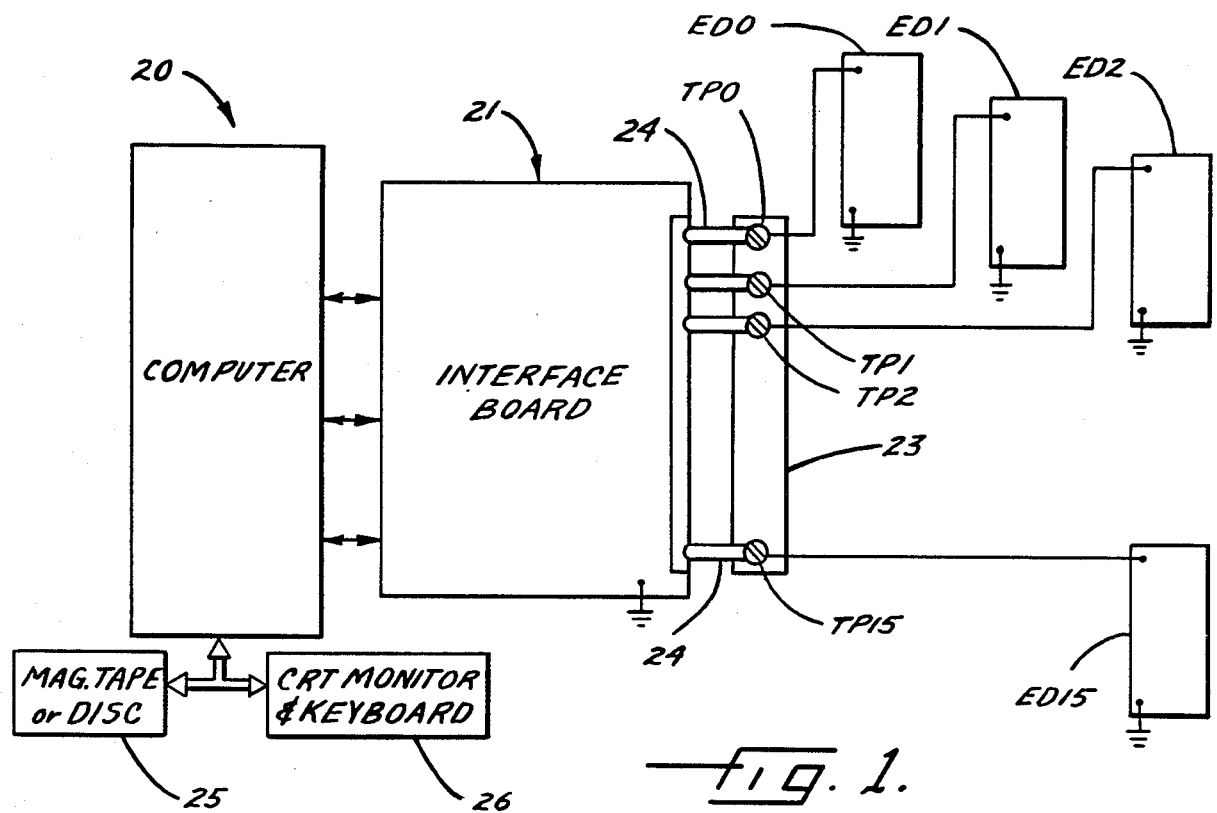
FIG. 1 is a block-and-line illustration, in generalized form, of a computer-based control system which includes a plurality of external devices.

The generalized control system shown in FIG. 1 includes a programmed digital computer 20 of any conventional and known organization, coupled through an interface printed circuit board 21 to a plurality of input or output terminals, here called terminal points TP0 through TP15. The terminal points are adapted (as here shown, by screws to grip spade lugs on lead wires) to be connected to respective external devices ED0 through ED15. Only four of the terminal points and four of the external devices are actually shown; the other twelve are implicit, as the drawing indicates. While only sixteen terminal points are thus indicated, it will be understood that this is merely a simplified example; in a commercial product there might be sixty-four, or indeed as many as five hundred twelve terminal points, each adapted to be connected directly to an external device when the computer is installed at a field site to create the entire control system.

The computer 20 is normally made up of components (clock oscillator, microprocessor, address and data buses, RAM and ROM memory chips, etc.) mountedon one or more printed circuit boards. Such boards and the interface board 21 plug into multiple connector racks associated with a mother board within a housing, as is well known. In the preferred commercial product form, the terminal points TP0–TP15 are carried on a rigid insulator strip 23, each terminal point being formed as a metal element or plate into which the lug-engaging screw is threaded. Each plate is, in effect, constructed to form a prong 24 adapted to "plug into" a mating portion on the interface board—so that a multiple-element separable connector is constituted by the strip 23 and one edge region of the board 21. When the computer in its housing has been manufactured at a factory and shipped to the site where it is to be used, the strip 23 can be unplugged from the board 21; the wire connections are made from the respective external devices to the respective terminal points (by tightening the screws down on spade lugs at the ends of the wires); and the strip 23 is then plugged back into or onto the circuit board so that the sixteen connections are established to the appropriate conductive ribbons on the latter. The computer and interface board or boards within their housing are a standard product usable in a wide variety of specifically different control systems. In most cases, it is not known until field installation occurs, precisely which class of external device will be connected to each one of the individual terminal points.

The computer 20 is usually coupled via output/input ports to a magnetic (tape or disc) reader and/or recorder 25 and to a conventional cathode ray tube monitor and keyboard unit 26. This permits a whole master program to be loaded into the instruction memory of the computer, usually after a particular external device has been assigned and connected to each terminal point which is used. The program can be edited by viewing the monitor and keying in appropriate entries on the keyboard.

In any composite, complete control system, a large number of external devices may be used, as previously explained. Each such device falls into one of two categories; it either feeds signal intelligence into the computer and is thus called an input device, or it receives and responds to signal intelligence and is thus called an output device. But an input device may be either one of two kinds; it may feed in a voltage which is variable according to the changeable magnitude of some sensed parameter (e.g., position, temperature, humidity, flow velocity, etc.) and thus be called an analog input device; or it may simply feed in a bistate signal which is "on or off" (high or low) depending upon whether a sensed limit switch (or any other bistate sensor) is open or closed. Likewise, any output device may be either one of two kinds; it may respond to an analog voltage variable in magnitude according to the numerical value of a changeable multibit word in the computer, or it may respond to a bistate voltage so as to be actuated or deactuated when that voltage is high or low according to the 1 or 0 contents of a particular memory bit location in the computer.

Thus, the particular external device ultimately connected to any given terminal point TP may be one of any four classes, namely:

CLASS I: a device to which a variable analog is to be outputted, such voltage corresponding in magnitude to the changeable numerical value of a preselected memory word W in the computer, CLASS II: a device to which a high/low bistate voltage is to be outputted corresponding to the 1 or 0 value of a predetermined memory bit location B in the computer, CLASS III: a device which inputs to its terminal point, a variable analog voltage whose magnitude is to be taken in and digitally represented numerically in a predetermined memory word U in the computer, or CLASS IV: a device which inputs to its terminal point a bistate voltage whose high or low state is to be represented digitally by a 1 or 0 stored in a predetermined memory bit location X in the computer.

Examples of analog output Class I devices are amplifiers driving motors to adjust the positions of movable members such as duct damper vanes or fluid flow valves, and power amplifiers which vary the excitation voltage of blower motors to adjust the volumetric rate of pumped air. By contrast, examples of digital output Class II devices are relays or solenoids which are actuated or deactuated when energized or deenergized by the outputted high or low voltage. The contacts of such a relay may control an indicator lamp or some motor simply to turn it on or off as dictated by the computer. Analog input Class III devices are typified by a potentiometer driven as a feedback sensor by a motor which moves a member (e.g. a damper vane) or a tachometer generator driven from a given motor to produce a variable voltage representative of the motor speed. Finally, Class IV bistate input devices are typified by limit switches or relay contacts which when closed exhibit low (essentially zero) voltage drop thereacross, but which when open exhibit the high voltage of a source connected thereacross.

As is well known, the computer takes in the intelligence (numerical and Boolean) represented by the signals from the external input devices. It processes the changing values of those variables in a control function implemented by the programmed algorithm to determine or compute changeable values of command signals for condition-influencing actuators. The command signals (both numerical and Boolean) are changed by updating predetermined words U and bit locations X in active memory, and those signals are then converted and applied to the external devices such that the controlled conditions (e.g., temperature, humidity, positions) are correctively adjusted or restored to set point values. By its overall program, the computer "scans in" all of the signals from the input devices and "scans out" the computer commands to the external output devices on a rapidly iterated schedule, with updates of the commands being made during some or all iterations. Although the computer does only one thing at a time, the repetition rate is so high that the sensing and the command corrections appear to be carried out with substantially continuous, real time action.

Figure 2:
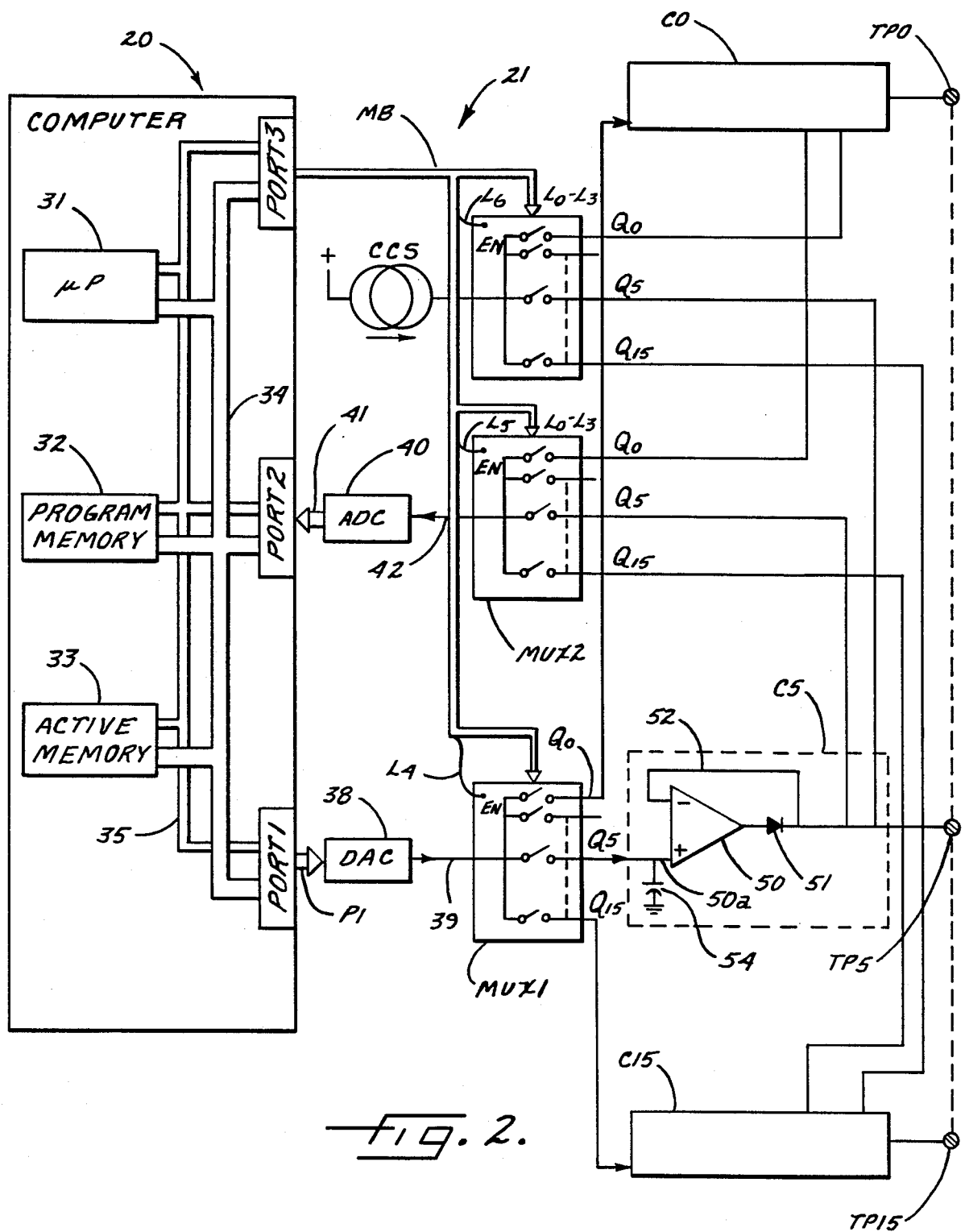
FIG. 2 is a diagrammatic illustration showing certain details of the computer and the interface portion of the system.

This will be better understood by reference to FIG. 2 where the computer 20 is shown in slightly greater detail as conventionally including a microprocessor 30, program memory 31 and active memory 32—all interconnected by a multibit address bus 34 and a multibit data bus 35. These busses extend to various input/output ports here shown as PORTS 1, 2 and 3. Each of those ports contain multibit components such as flip-flops together with means to latch signals appearing on the data bus when the address signals correspond to respective unique codes. Thus, by executing appropriate instructions, the microprocessor can write to or read from each port essentially the same as if the port were a word of active memory.

PORT 1 is here used as an output port. The microprocessor can, by executing instructions, fetch a preselected memory word W (which has been correctively updated to a desired command value) to its ALU and then write the contents to PORT 1 where they are latched and appear on the multibit output lines P1. These binary signals are thus applied to the inputs of a DAC 38 having a single output terminal 39 leading to the input of a select one-of-sixteen multiplexer circuit MUX1 having output terminals $Q_0$ to $Q_{15}$.

PORT 2 is here used as an input port. Its multibit input lines 41 connect from the multibit output of an ADC 40 whose single input line 42 is the common output of a select one-of-sixteen multiplexer MUX2 having input terminals $Q_0$–$Q_{15}$. If the $Q_0$ path through the multiplexer is enabled, the voltage at the $Q_0$ input is fed to the ADC 40 and the magnitude of the voltage is then represented in binary notation in PORT 2. The microprocessor, by execution of an appropriate instruction, can read the PORT 2 contents to its ALU and then write those contents to a predetermined word U in active memory—and from which they may later be taken as an operand in executing the control algorithm.

It is to be noted that the analog-to-digital connector need not take the conventional physical form of a multi-stage circuit which sums dc. voltages weighted according to bit-place values, as the standard block 40 would normally represent. It may be desirable in some cases to create a "software ADC" by which a digital word is incremented in a software loop until its analog equivalent is signaled by a comparator as having reached a value equal to the unknown, incoming dc. voltage. This old and known alternative is described, for example, in copending U.S. application Ser. No. 892,131, filed July 30, 1986, now U.S. Pat. No. 4,817,002 and assigned to the assignee of the present application. The details and specific hardware of the ADC are not of significance in the practice of the present application, and the block 40 representing an analog-to-digital computer is to be taken as designating either a conventional, self-contained converter or the well-known equivalent software-implemented converter.

PORT 3 is here used for controlling MUX1, MUX2 and a third multiplexer MUX3 associated with a constant current source CCS. The MUX3 is a select one-of-sixteen circuit which will permit constant current to flow via a selected one of its output terminals $Q_0$ to $Q_{15}$ when a current path leads from that terminal. PORT 3 feeds its output to a six-conductor multiplexer control bus MB here shown by way of example. The first four lines $L_0$–$L_3$ of the bus MB extend to all three MUX circuits, and the binary signals thereon select or activate the corresponding one of the sixteen paths in each of the MUX's. The MUX's are normally disabled, however, and are respectively enabled by a high (binary 1) signal on line $L_4$, $L_5$ or $L_6$. One skilled in the art will readily understand how the computer can, by executing different instructions, control the operation of the three MUX's. For example, if the microprocessor sends the binary signals 010 1001 to, and latches them in PORT 3, the lowest order bits 1001 will select the $Q_7$ path in each MUX circuit; but because the line $L_5$ will be high and lines $L_4$ and $L_6$ both low, only the $Q_7$ path of MUX2 will be completed. If the binary signals in PORT 3 are 001 0011, then only the $Q_3$ path through MUX1 will be completed. From these examples, the control and operation of the MUX's will be clear.

As is known in the art, by appropriate programming instructions, the MUX's provide for time sharing PORTS 1 and 2 and the source CCS so that sixteen variables can be outputted or inputted during a scanning sequence. The sixteen paths of the MUX's are connected to the terminal points TP0–TP15 through additional interface circuits C0 through C15 all of which are identical and which are next to be described.

As indicated in FIG. 2, the sixteen interface circuits C0–C15 are all identical; a description of the circuit C5 will thus suffice to explain the inner details of the others which are connected to their respective multiplex circuit terminals in the same fashion as the circuit C5 is connected to the three MUX terminals $Q_5$.

To send a dc. voltage signal from a word W5 in computer memory to a Class I or II device coupled to point TP5, the contents of that word are written to PORT 3 and applied as multibit input signals to the DAC 38. MUX1 is conditioned to pass the dc. voltage output of the DAC 38 through its $Q_5$ path which leads to a "sample and hold" amplifier 50 forming a part of interface circuit C5. More specifically, the amplifier 50 is constituted by a commercially available summing operational amplifier having non-inverting and inverting inputs 50a, 50b and an output terminal 50c. This operational amplifier is preferably characterized by high open loop gain and high input impedance. It operates in well known fashion to make the output at 50c essentially proportional to the difference between the input voltages applied at 50a and 50b. The amplifier 50 is here connected, however, as a voltage follower by virtue of a negative feedback connection.

In accordance with the present invention, the operational amplifier is isolated from the terminal point TP5, when a Class III or IV device is connected to the latter, by an asymmetrically conductive diode 51 that coacts with a subroutine module of the computer's program which is appropriately edited when or after a decision is made to associate a Class III or IV device with that point. As here shown, the diode 51 is connected between the amplifier output 50c and the point TP5 and forwardly poled to conduct current only from the former to the latter. A negative feedback connection 52 is made, not from the amplifier output 50c but, from the terminal point TP5 to the inverting input 50b. The negative feedback signal is thus taken from the downstream side of the diode 51—and this essentially eliminates any inaccuracy in the magnitude of the final output voltage at TP5 when a Class I device is hooked to and served by the terminal point TP5. The "voltage follower" action makes the voltage at TP5, rather than the voltage at 50c, "follow" the magnitude of the changeable input voltage at 50a—as will be explained later.

To make the operational amplifier 50 not only a voltage follower but also one with "sample and hold" action, a capacitor 54 is connected between the non-inverting input 50a and a point of common reference potential here shown as ground. This ground point is common to the circuits in the computer 20, the DAC 38, the ADC 40, the current source CCS, the three MUX's, and the several external devices—in accordance with conventional and well-known practice. When the DAC output at 39 changes from one voltage value to another and the MUX1 $Q_5$ path is completed, the capacitor 54 quickly charges or discharges to take on the latest and identical voltage value. If the $Q_5$ path is then broken, that voltage value remains on the capacitor, for a reasonable period of time until refreshed, and constitutes the input signal at 50a because the high input impedance of the amplifier 50 prevents all except negligible discharge current from the capacitor.

It will be understood that the master program loaded into the program memory 32 includes a "scan-in, scan-out" subroutine which is entered on regularly timed interrupts or from time-to-time as a result of logical jumps. Each of the terminal points is serviced by execution of a portion or module of the subroutine, so that intelligence is sent out to each terminal point assigned and connected to a Class I or II device or intelligence is taken in from a Class III or IV device. Generally speaking, the three MUX's are sequenced to scan the several terminal points TP0–TP15 through the connections within the interface circuits C0–C15, although it is not at all necessary that the terminal points be serviced in numerical or any other particular order.

FIGS. 3–6 will aid in understanding how the interfacing hardware for the terminal point TP5, as an example, operates for the four cases when the associated external device is of Class I, II, III or IV, respectively.

Figure 3:
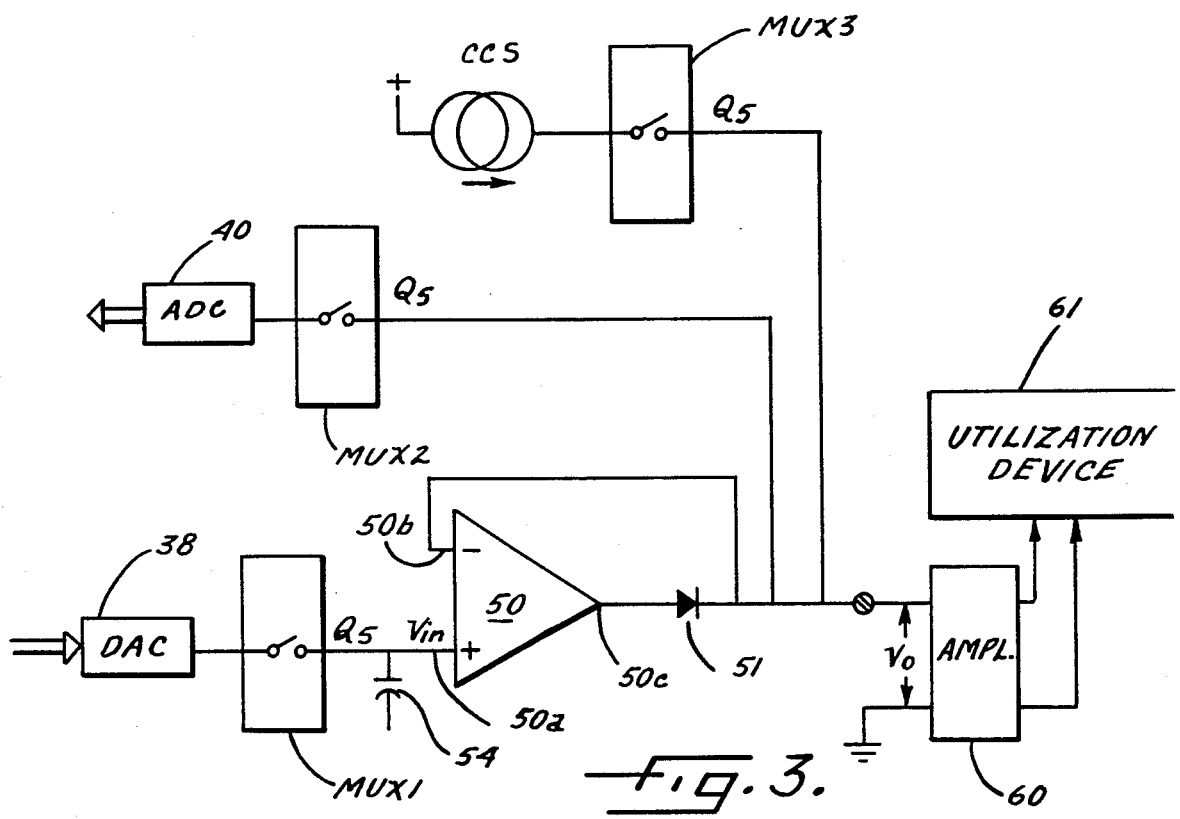
FIGS. 3-6 are schematic diagrams of the interface circuitry associated with a typical terminal point TP5 connected to an exemplary external device which is respectively of Class I, II, III and IV.

In FIG. 3, a Class I device is constituted by a driver amplifier 60 having its input terminal connected to point TP5 and its output coupled to energize a utilization device 61. The latter might typically be a motor whose speed is to be controlled or a positioning servo actuator driving a member whose position is to be controlled. When the dc. voltage $V_o$ at TP5 is to be updated, the computer 20 will write the word $W_5$ to PORT 3 and a command voltage of corresponding magnitude will appear at the output of DAC 38. MUX2 and MUX3 will be disabled so their respective $Q_5$ paths are open; MUX1 will be conditioned to complete its $Q_5$ path, so the output of DAC 38 will appear across capacitor 54 and remain there even after that $Q_5$ path is interrupted. The input voltage $V_{in}$ thus applied at 50a causes the output of amplifier 50 to increase or decrease, so that output voltage $V_o$ at TP5 (which is the input signal for amplifier 60) will tend to increase or decrease greatly due to the high open loop gain. The negative feedback voltage $V_f$ will correspondingly increase or decrease, however, and this tends to make the amplifier output decrease or increase—and with the same high gain action. In consequence, when the input voltage $V_{in}$ changes to or takes on any given value, the output voltage $V_o$ takes on a value which is for all intents and purposes equal to $V_{in}$, that is, differs by an amount on the order of a hundred microvolts. This results from the fact that when the open loop gain of the amplifier is about 100,000 (a gain exhibited by common commercially available op. amps), so that for any value of the input voltage $V_{in}$, the feedback voltage $V_f$ need only differ by less than a millivolt to produce an output voltage $V_o$ that is essentially equal to the feedback voltage itself. Thus, the voltage $V_o$ is always essentially equal to the voltage $V_{in}$. Virtually perfect voltage follower action is achieved and despite the forward conduction voltage drop $V_d$ across the diode 51 when it conducts current through the input impedance of the external device, i.e., the input impedance of amplifier 60.

All solid state diodes such as the diode 51 exhibit an essentially constant "forward drop" $V_d$ (typically 0.5 to 0.7 volts) regardless of the magnitude of forward current passing therethrough. The magnitude of the forward current depends upon the size of the voltage $V_o$ and the input impedance of the amplifier 60; typically it may lie between 0.0 to 10.0 milliamperes. If the negative feedback connection 52 were taken from the output 50c to the inverting input 50b, as is the normal practice, then the voltage follower action would make the voltage at amplifier output 50c essentially equal to $V_{in}$ and the forward drop $V_d$ across the diode 51 would cause the output voltage $V_o$ to be erroneously less than the input voltage $V_{in}$. For example, if $V_d$ is 0.6 volts and $V_{in}$ happens to be 5.3 volts, then $V_o$ would be 5.3−0.6=4.7 volts which is a significant error in relation to the desired value of $V_o$=5.3 volts for one-to-one tracking of $V_o$ and $V_{in}$. The percentage of this error is nonlinear; that is, it becomes greater as $V_{in}$ takes on lower values within its operational range of, say, 0 to 12 volts.

In accordance with one feature of the invention, the negative feedback connection 52 is taken from the downstream end of the diode 51, i.e., from the terminal point TP5. In consequence, the amplifier 50 automatically compensates for the forward drop $V_d$ and causes $V_o$ to track, essentially exactly, the input voltage $V_{in}$. The downstream feedback connection provides a second and important advantage in affirmatively biasing the diode 51 to a non-conductive when point TP5 is associated with a Class III or IV device, as explained more fully below.

In summary, FIG. 3 makes clear how the interface circuit C5 operates to transfer a dc. command voltage $V_o$ to a Class I external device. On a periodically repeated basis, the computer writes the changeable contents of a memory word $W_5$ to PORT 1, the computer applies signals to PORT 3 which causes completion of only the path $Q_5$ in MUX1 (MUX2 and MUX3 being disabled); and the voltages $V_{in}$ and $V_o$ thus immediately take on magnitudes equal to one another and proportional to the then-existing numerical value in the word $W_5$. As the computer goes on to succeeding steps of its scanning sequence, the $Q_5$ path of MUX1 will re-open, but the capacitor 54 will maintain $V_{in}$ (and thus $V_o$) at their latest updated magnitudes until the next updating action occurs. Thus, the Class I external device (constituted by 60, 61) will be commanded to act in accordance with the numerical value of the word $W_5$ as that value is changed (or kept constant) by repeated passes through the main control algorithm.

Figure 4:
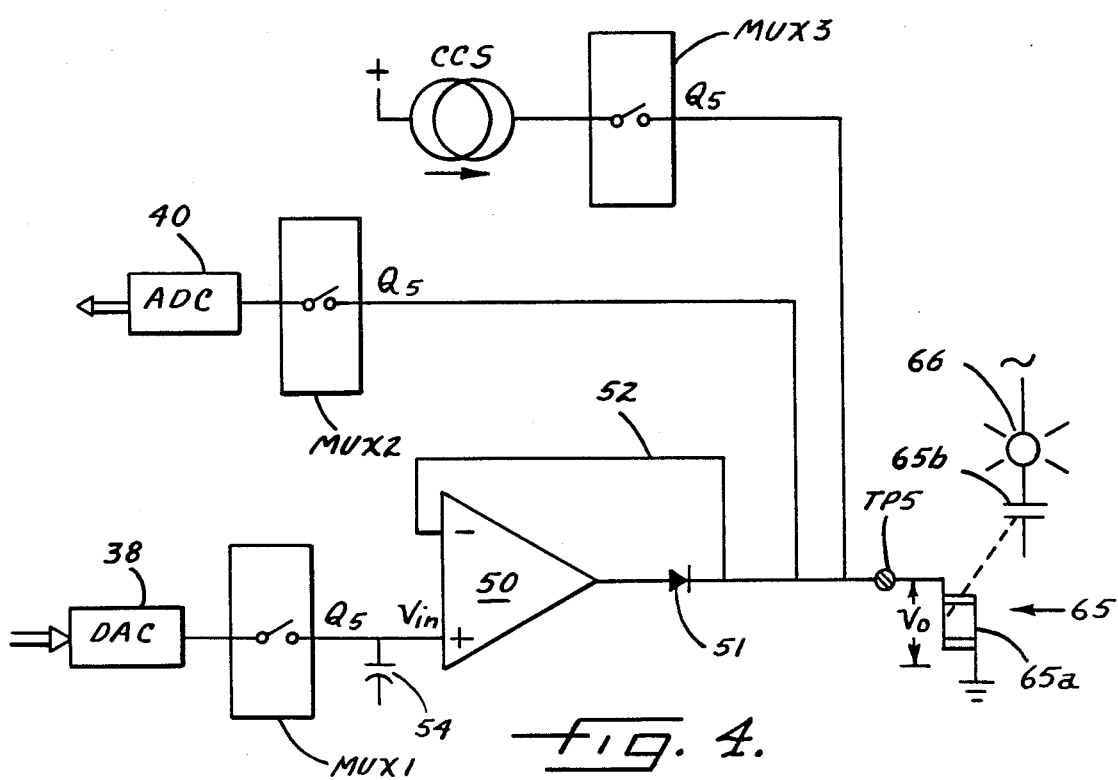

In FIG. 4, the external device connected to TP5 is of Class II, here exemplified by a bistate relay 65 having a coil 65a controlling contacts 65b, the latter being in series with an ac. source and an indicator lamp 66 (such as a red light alarm). As the computer iterates through its main algorithm, it may set a predetermined memory bit location $B_5$ to hold a 0 or 1 when conditions make it desirable for the lamp 66 to be turned on or off. As additional examples, other Class II devices may deal with on-off control of motors or solenoid valves.

Assuming for purposes of discussion that the voltage $V_o$ in FIG. 3 may take on any value between 0 and 12 volts as the word $W_5$ numerical value changes between zero and a maximum M represented by all 1's in the multiple bit places, then the relay coil 65a will be rated for 12 volts, e.g., the relay will be picked up if the applied coil voltage is from 10 to 12 volts but dropped out if the applied coil voltage is less than 6 volts. To service the point TP5 and its Class II device during each scan, the computer program is organized to pull the bit $B_5$ from memory and to perform a logical writing to PORT 1. If the $B_5$ contents are "0", a low numerical value (for example, zero represented by 0's in all bit places) is written to PORT 1; if the contents are "1", a high numerical value (for example M represented by 1's in all bit places) is written to PORT 1. Such low and high values are chosen respectively to make the voltages $V_{in}$ and $V_o$ both be below 6 volts or above 10 volts, respectively. The computer then writes to PORT 3 signals which complete the path $Q_5$ of MUX1 but leave MUX2 and MUX3 disabled. As a result, the voltages $V_{in}$ and $V_o$ take on low or high (0 or 12 volts) values and the relay 65 is deactuated or actuated to turn the lamp 66 off or on depending upon the contents of the $B_5$ memory bit location. As the scanning action continues, and thus the $Q_5$ path of MUX1 opens, the capacitor 54 maintains the voltage $V_{in}$ at its last-established value.

Figure 5:
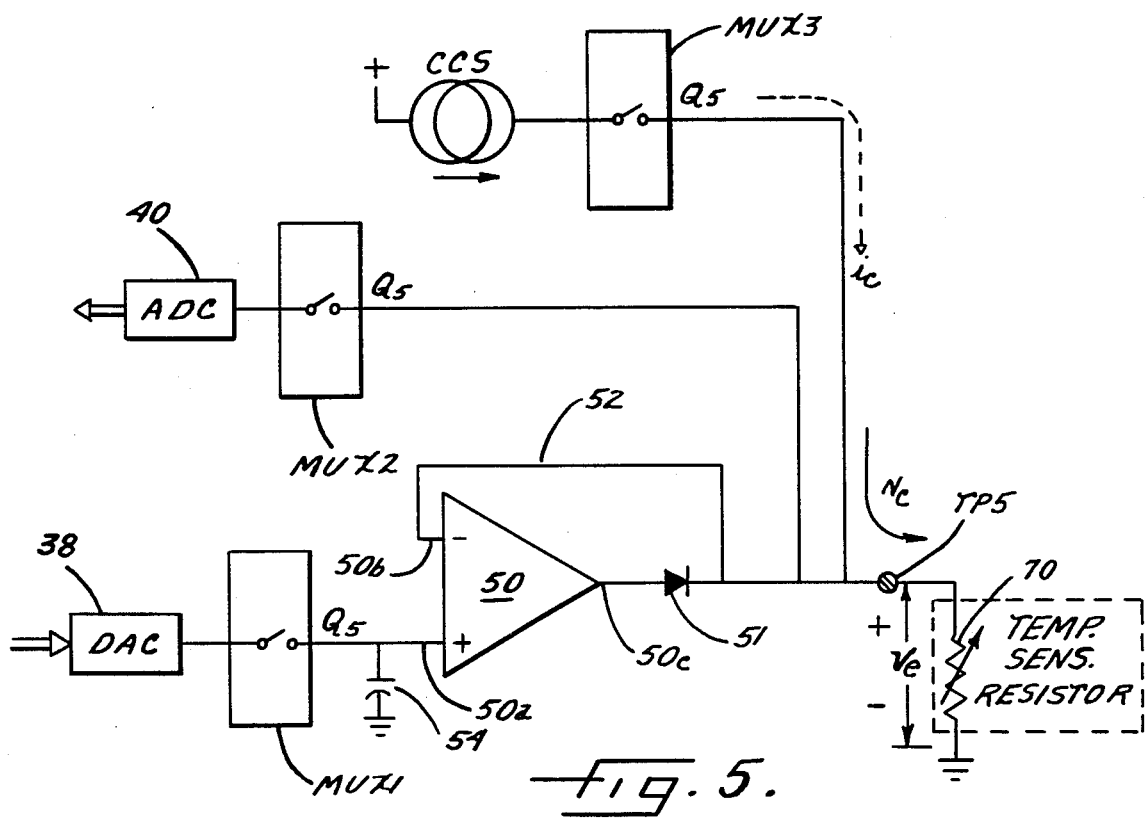

FIG. 5 illustrates, by way of example, a Class III external device coupled to the point TP5 and shows the operation of the interfacing circuit components when a variable external analog voltage $V_e$ is to be taken into the computer as representing some sensed parameter. In FIG. 5, the external device is passive and shown as a temperature sensor in the form of a resistor 70 whose ohmic value changes as a known function of changes in its temperature. When the scanning subroutine of the computer reaches the portion which services TP5, the computer will first write a numerical value of zero to PORT 1 (so the bits of the word at P1 are all 0's) and enable path $Q_5$ in MUX1. As a result, the voltage $V_{in}$ is set to zero. Then, the computer enables path $Q_5$ in both MUX2 and MUX3. The current source CCS thus sends a predetermined constant current $I_c$ via TP5 through the passive resistor 70 so that the external voltage $V_e$ takes on a magnitude which is a known function of the changeable sensed temperature. This voltage $V_e$ appears at the input $Q_5$ of MUX2 and is thus passed to the input of ADC 40 whose multibit output signals therefore numerically correspond to the voltage $V_e$ and the sensed temperature. While the interface circuitry is so conditioned, the subroutine program causes the computer to read the signals applied to PORT 2 and transfers (writes) them to a predetermined memory word location $U_5$. Subsequently in executing the main algorithm, that word may be read and used in computations to arrive at different commanded values (for example, the value of the word $W_2$ if a Class I device is connected to TP2).

Figure 5A:
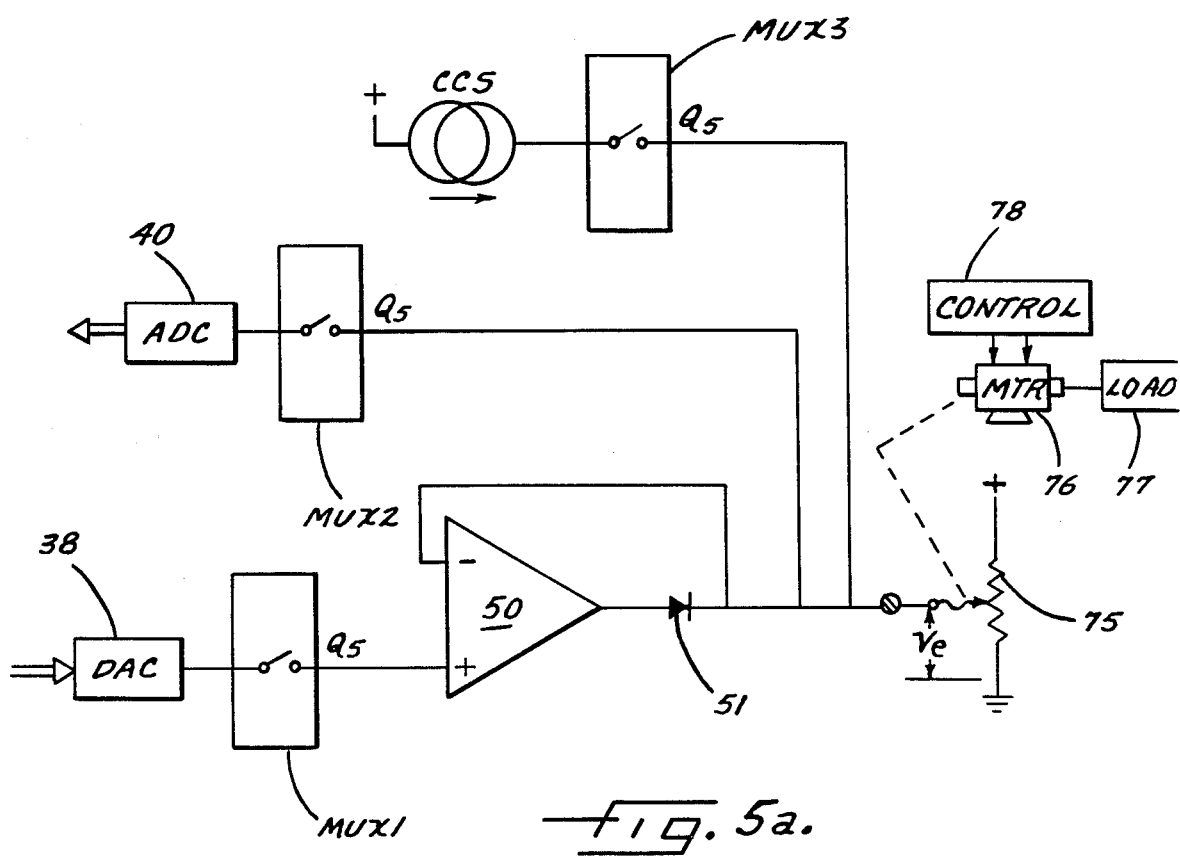
FIGS. 5a and 6a are similar to FIGS. 5 and 6 but show the terminal point connected to Class III and Class IV external devices which actively create a changeable external voltage.

FIG. 5a shows a slight modification of FIG. 5. Here the external device is "active" in the sense that it independently produces the voltage $V_e$ without the need for excitation by the constant current $I_c$ (as in FIG. 5). Although many different specific forms of "active" Class III devices may be accommodated, that shown as an example in FIG. 5a is the feedback potentiometer 75 of a servo motor 76 connected to adjustably position a movable load 77 such as a duct vane or a proportioning valve. The motor is energized by a control unit 78 (which may be one of the Class I devices) to move the load. The potentiometer is excited from an appropriate dc. voltage source (+) and its wiper is changeably positioned with the load. Then the voltage $V_e$ at the wiper, and connected to point TP5, will by its magnitude constitute a feedback signal proportional to the actual position of the load 77. The interface circuit is scanned and operates in FIG. 5a in exactly the same fashion previously described with reference to FIG. 5 except that the MUX3 is simply not enabled.

Figure 6:
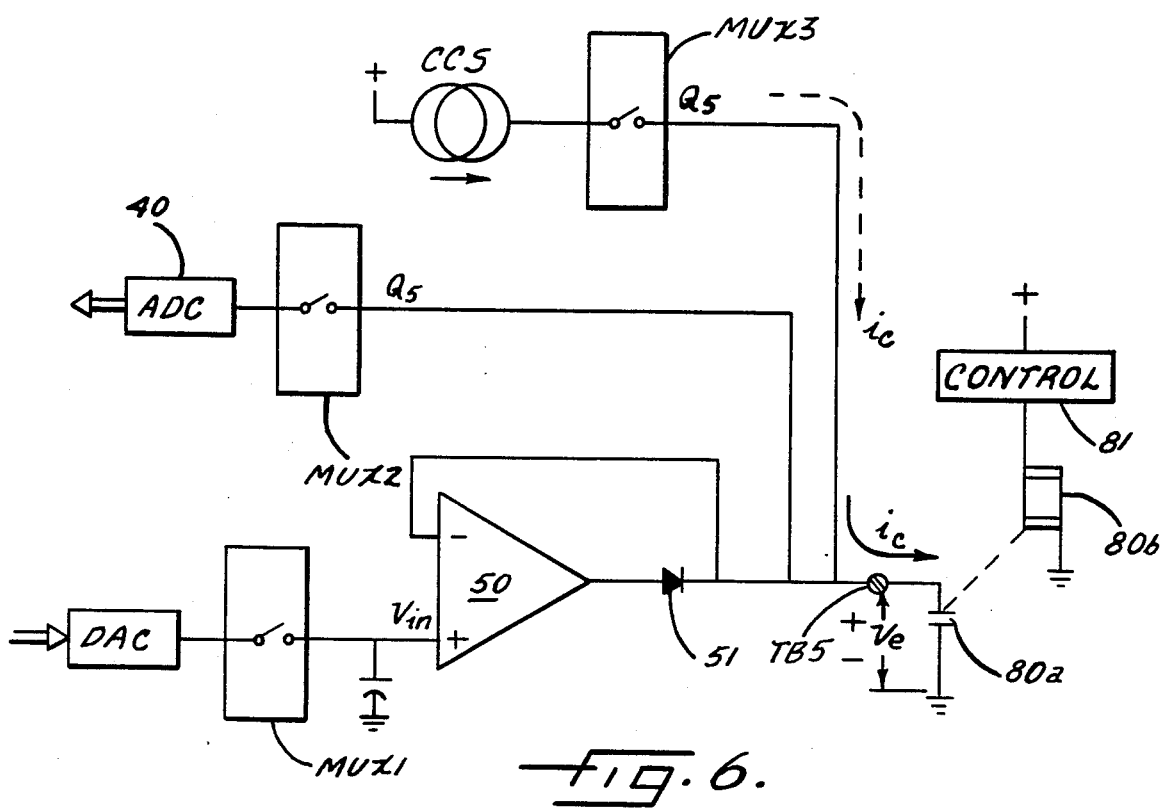

In FIG. 6, the external device is of Class IV and provides a bistate signal which takes on either an "off" or an "on" value. As here shown by way of example, the device is simply the contacts 80a of a relay having a coil 80b which is turned on or off by some external control unit 81. Obviously the contacts 80a could alternatively be a limit switch which is mechanically opened or closed. To send intelligence into the computer indicating the state of the contacts 80a, those contacts are simply connected between terminal point TP5 and ground. The scanning subroutine portion for TP5 is appropriately written or edited to carry out the following operations. First, a numerical value of zero is written to PORT 1. Then the computer writes appropriate signals to PORT 3 which cause MUX1, MUX2 and MUX3 all to complete their $Q_5$ paths. As a result, the voltage $V_{in}$ for the amplifier 50 is set to zero, and the source CCS ends the constant current $I_c$ through the contacts 80a but only if they are closed (and, incidentally, present a low or zero resistance to the flow of current). If the contacts 80a are open, the current $I_c$ cannot flow and the source CCS by its design produces an open circuit voltage of a selected high value (e.g., 12 volts). Thus, when the contacts 80a are respectively closed or open, the external voltage $V_e$ across contacts 80a will be low (zero) or high (12 volts). This external voltage is presented to the $Q_5$ input of MUX2 and thus transmitted to the input of ADC 40 whose output is fed to PORT 2. The computer then "reads" PORT 2 and performs a logical comparison. If the PORT 2 signals represent a numerical value less than or greater than half of the maximum possible value M, then a bit value of "1" or "0" is written to a preselected bit location $X_5$ in the computer memory. Thus, in the execution of its main algorithm if there is a need to perform or omit certain steps depending on whether the contacts 80a are currently opened or closed, the computer reads that bit location $X_5$; if its value is "1" or "0" the contacts are known to be in a closed or opened state, respectively.

Figure 6A:
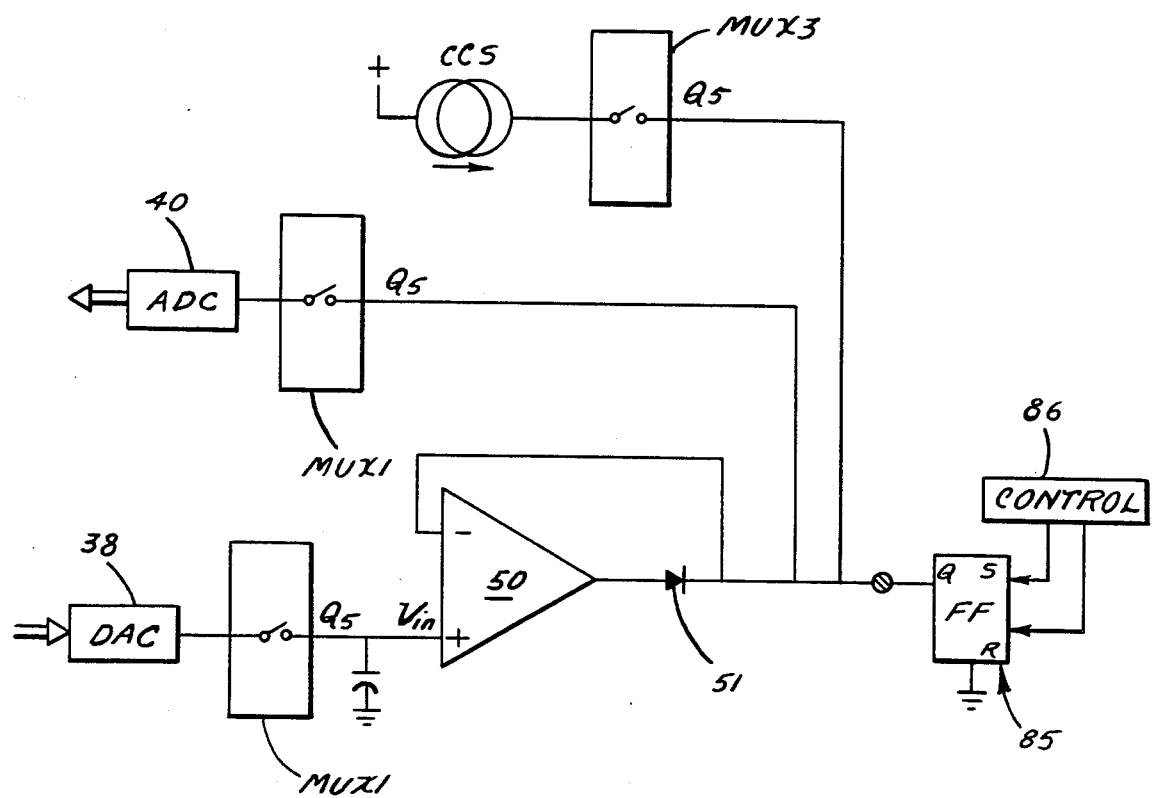

The bistate device (contacts 80a) in FIG. 6 is passive; its state (opened or closed) is converted into a high or low value (0 or 12 volts) for the voltage $V_e$ by the constant current source CCS and the completion of the $Q_5$ path through MUX3. FIG. 6a shows a modification wherein the Class IV external device is "active" and directly creates the voltage $V_e$. As here shown in FIG. 6a, the external device is a flip-flop 85 which is from time-to-time set or reset by an associated control unit 86 so that the voltage at its Q output is set to a "1" or "0" level (e.g. 12 or zero volts). The Q output of flip-flop 85 is connected directly to point TP5. The operation is the same as that described with reference to FIG. 5 except that the MUX3 is not enabled and the constant current $I_c$ is not necessary. When the point TP5 has been scanned as described for FIG. 5, the memory bit location $X_5$ will contain a "1" or a "0" if the flip-flop 85 is at that time residing in a set or a reset state.

The importance of the diode 51, upstream of the point TP5 from which the feedback connection 52 is taken, will now become apparent. If that diode were absent and replaced by a direct wire connection, then when a Class III or IV device is connected to the point TP5, the external voltage $V_e$ at any significant positive level would make the amplifier 50 try to pull the potential of point TP5 to some value representing the difference between $V_{in}$ and $V_e$. This would inevitably make the voltage input at $Q_5$ of MUX2 take on some value other than the original $V_e$—so that the resultant contents stored at word $U_5$ or bit location $X_5$ would be in error. But with the diode 51 present and cooperating with the scan program described above—by which $V_{in}$ is set to zero when a Class III or IV device is being scanned—the output at 50c of amplifier 50 is affirmatively forced to a zero (or a saturated negative) potential. Because the external voltage $V_e$ is always more positive, the diode 51 is reverse biased so that it is non-conductive and therefore isolates the amplifier 50 from the terminal point TP5. The voltage $V_e$ is therefore wholly unaffected by the presence of the amplifier 50. Yet, any one of a Class I, II, III or IV external device may be connected to the point TP5 without the need for any wiring change whatever in the interface circuitry. It is only required that the scanning subroutine module be edited in a simple fashion to accommodate the particular class of external device which has been, or will be, connected to that particular terminal point. In particular, and in accordance with the invention, when the associated external device is of Class III or IV, the scanning program module is edited to include steps which write "zero" to PORT 1 and to set the input $V_{in}$ to zero.

Figure 7:
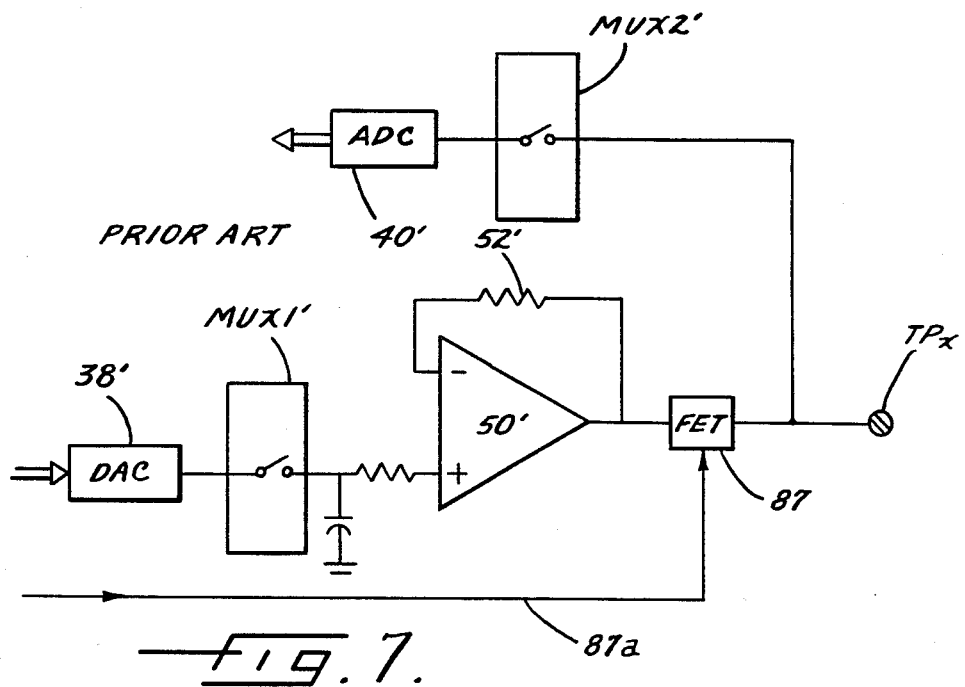
FIG. 7 is a schematic diagram of interface circuitry associated with a terminal point according to a prior art practice.

To the extent of applicant's knowledge, the closest prior art, relative to an interfacing arrangement as described with reference to FIGS. 2-6, is the interfacing apparatus that was included in commercial, computer-based control product known by the trade name "ECON VI" and sold by Barber-Colman Company beginning about 1981. The interface circuit for one of the plural terminal points in the ECON IV system is shown in FIG. 7. It included a DAC 38', ADC 40', MUX1', MUX2' and a summing operational amplifier 50' all associated with a given terminal point $TP_x$. The terminal point $TP_x$ was indeed "universal" in the sense that any one of a Class I, II, III or IV external device could be chosen and connected to that point, and the scanning program was thereafter edited or written to control the MUX's and the reading to or writing from computer ports generally as described above. There were, however, significant differences, inconveniences and disadvantages. Notably, a field effect transistor (FET) gate 87 was connected between the amplifier output and $TP_x$ to provide a means for permanently disconnecting the two whenever a Class III or IV device was selected for connection to that point. The gate 87 was opened or closed by the presence or absence of a high potential applied to a gate-control conductor 87a. When a Class I or II external device was elected for the given point $TP_x$, then a physical connection was completed from the conductor 87a to a circuit terminal (not shown) that always reside at a high potential whenever the computer was "powered up" and operating. Thus, whenever a Class I or II device was elected, the FET gate 87 associated with the given point $TP_x$ was always enabled and conductive. That gate would thus conduct current and transmit the amplifier output to the connected Class I or II external device. But because the feedback connection 52' was taken from the upstream side of the FET gate, the undiminished forward voltage drop (e.g., about 0.5 volts) across the latter reduced the final output voltage to create inaccuracy. When a Class III or IV device was elected, the control conductor 87a would be left physically disconnected, and thus the gate 87 would prevent the amplifier 50' from erroneously influencing the external voltage fed to the input of MUX2, regardless of the value of any input voltage then fed to the amplifier. There were no edited program steps to affirmatively set the input to amplifier 50' to zero.

Thus, once any election (Class I or II vs. Class III or IV) was made, and the corresponding wiring connection 87a was made or omitted, the given terminal point $TP_x$ was permanently dedicated to that election, unless of course the wiring connection were changed.

More significantly, each FET gate 87 carried with it a cost of about $1.50 to $1.75. In a system with 512 terminal points, all of the FET gates would amount to about $768 in component cost. When conventional solid state diodes 51 are employed as described above, each costs about 8¢ and the total cost of the 512 components is only about $41. Thus, the present invention yields a real economy in manufacturing cost.

The use of the diode 51 located upstream of the feedback connection 52 does requires cooperating apparatus which is collectively constituted by the computer and the software scanning subroutine portion, the latter being formed by editing when any given class of external device is chosen for a given terminal point. The subroutine module is formed, when a Class III or IV device is chosen, such that the input voltage $V_{in}$ to the amplifier 50 is affirmatively set to zero thereby to assure that the diode 51 will be reversely biased and non-conductive.

Figure 8:
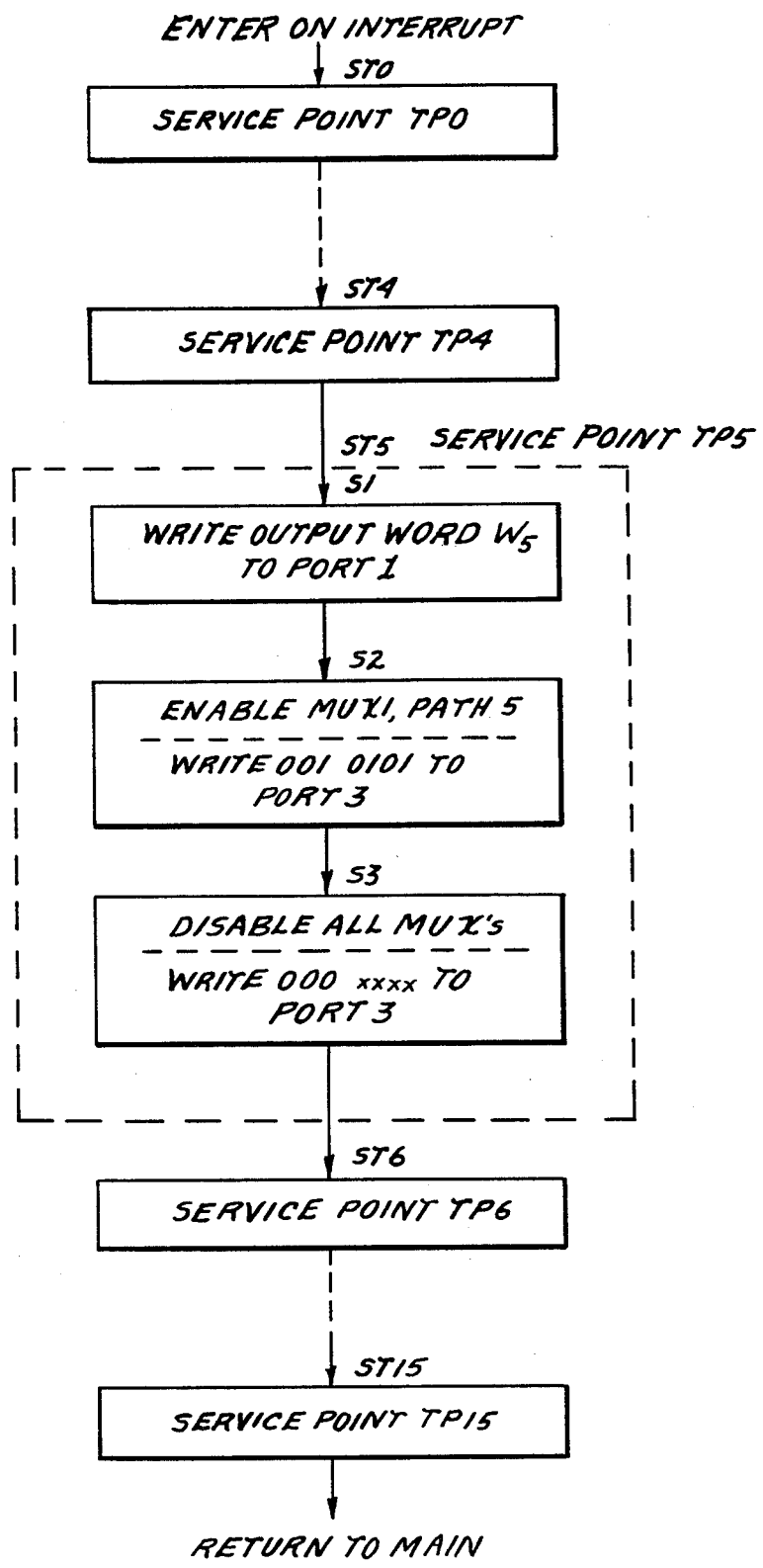
FIG. 8 is a flow chart of a programmed subroutine loaded into the program memory of the computer, and showing in detail the edited program module for servicing the terminal point TP5 when the connected external device is of Class I as illustrated in FIG. 3.

FIG. 8 shows one example of a scanning subroutine by which intelligence is fed out to the several Class I or II devices associated with different ones of the points TP0–TP15 (FIG. 2) or taken in from any Class III or IV. The subroutine is entered at stage ST0 which is the beginning of an instruction module for servicing (sending intelligence out or taking it in) the first point TP0. Although the terminal points need not be scanned in numerical order, FIG. 8 indicates that the sequence proceeds from stage ST1 to ST2, ST3 ... ST15, that is, through sixteen such modules executed in sequence, after which the subroutine is completed and the computer returns to its main program. The module for servicing point TP5 is shown in detail for the case when the associated external device is of Class I (as described with reference to FIG. 3). At Step S1, the computer writes the contents of a preselected memory word $W_5$ to PORT 1. Next, during Step S2 only path $Q_5$ of MUX1 is enabled by the writing of binary signals 001 0101 to PORT 3—so that the voltage $V_{in}$ now takes on a magnitude proportional to the numerical value in the word $W_5$. The capacitor 54 (FIG. 3) holds that voltage, and the output voltage $V_o$ is placed at essentially the same value, as previously explained. Then at Step S3 all MUX's are disabled (MUX2 and MUX3 never having been activated) by writing all 0's to PORT 3 (or at least to the three highest order bit places). Scanning through the whole subroutine and the TP5 service module is repeated frequently at any desired frequency (say 1000 or 100 or 10 times per second); therefore as the numerical value of the $W_5$ word is changed (according to the main algorithm) the voltage $V_o$ is promptly updated to the new value and the Class I device in FIG. 3 is supplied with properly changing commands.

Figure 9:
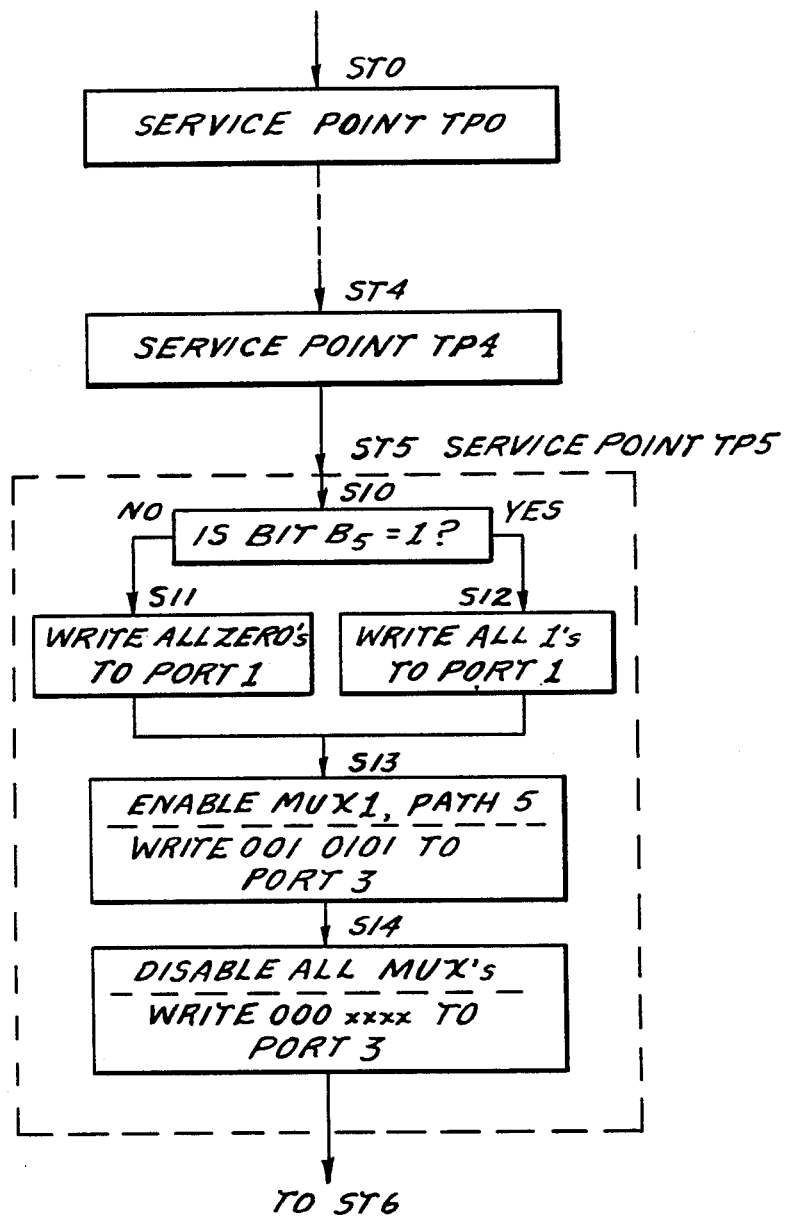
FIGS. 9, 10 and 11 are similar to FIG. 8 except that they respectively show in detail the edited program portions for the Class II, III and IV devices illustrated in FIGS. 4, 5 and 6.

If the external device coupled to point TP5 is of Class II (FIG. 4) rather than Class I (FIG. 3), the subroutine module for servicing TP5 is modified by editing to take the form shown, for example, in FIG. 9. As there indicated, computer is instructed by Step S10 to fetch the content of a predetermined and designated memory bit location $B_5$ and to logically determine if it is a 0 or a 1. If the former, the operation proceeds to Step S11 which causes some low valued constant (e.g. zero signaled by 0's in all bit places) to be written to PORT 1. If the latter, the operation proceeds instead to Step S12 which causes a high valued constant (e.g., all 1's) to be written to PORT 1. In either case this is followed by Steps S13 and S14 which are identical to Steps S3 and S4 in FIG. 8. Therefore the voltages $V_{in}$ and $V_o$ take on low or high values depending on whether the bit $B_5$ location then holds a 0 or a 1, and the relay 65 (FIG. 4) is correspondingly deenergized or energized. As scanning continues, the relay will retain that state, but each time the point TP5 is serviced the state of the relay 65 may be changed if the content of the bit location $B_5$ has been changed.

Figure 10:
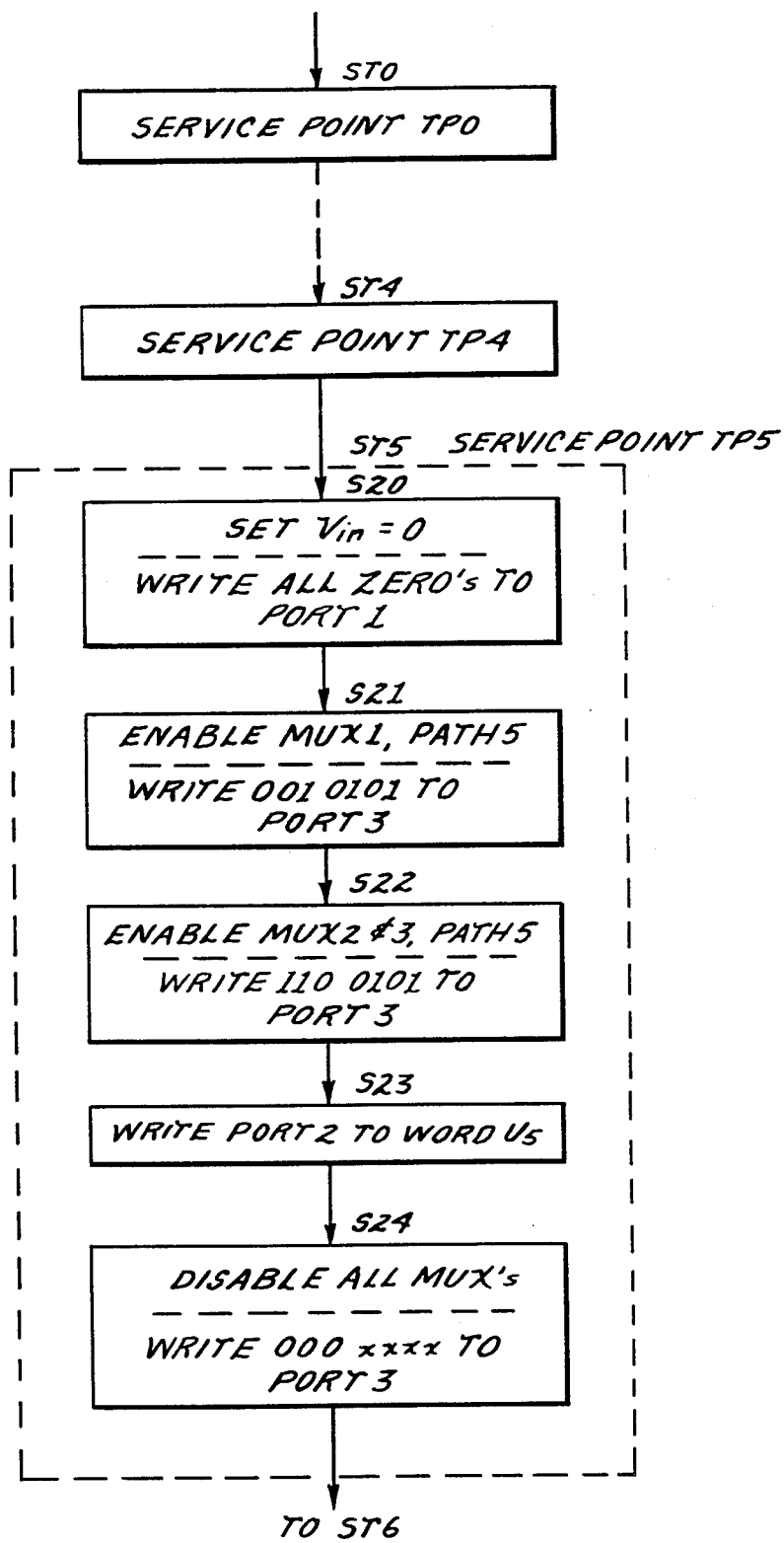

FIG. 10 illustrates how the instructions of the servicing module for point TP5 is organized, by editing, when the associated external device is of Class III (FIG. 5). Here, the first Step S20 instructs the computer to write "zero" (all 0's) to PORT 1. At Step S21, the $Q_5$ path of MUX1 is enabled by writing the bit pattern 001 0101 to PORT 1, so the input voltage $V_{in}$ is set to zero. This will assure that if the external voltage $V_e$ is greater than zero, the diode 51 will be reverse biased. Next by Step S22 the $Q_5$ paths of MUX2 and MUX3 are enabled (and MUX1 may be disabled). The constant current $I_c$ is thus fed to the temperature sensitive resistor 70 (FIG. 5) and the voltage $V_e$ becomes proportional to sensed temperature. That voltage is fed to the ACD 40 and its magnitude is reflected as a numerical value digitally signaled at PORT 2. At Step S23, the contents of PORT 2 are written to a preselected memory word $U_5$—and may be used thereafter by the computer in its main algorithm. Then, by Step S24 all the MUX's are disabled (as described above for Step S3); and the scanning proceeds to the software module for the next point TP6.

If the Class III external device is "active" as described above relative to FIG. 5a, the edited program module for point TP5 will be made the same as represented by the FIG. 10 flow chart except for one slight difference. Step S22 will be organized to enable the $Q_5$ path of only MUX2 (rather than both MUX2 and MUX3) by writing 010 0101 to PORT 3. Thus the constant current source CCS is not connected to supply the constant current $I_c$ as in the case of FIG. 5.

Figure 11:
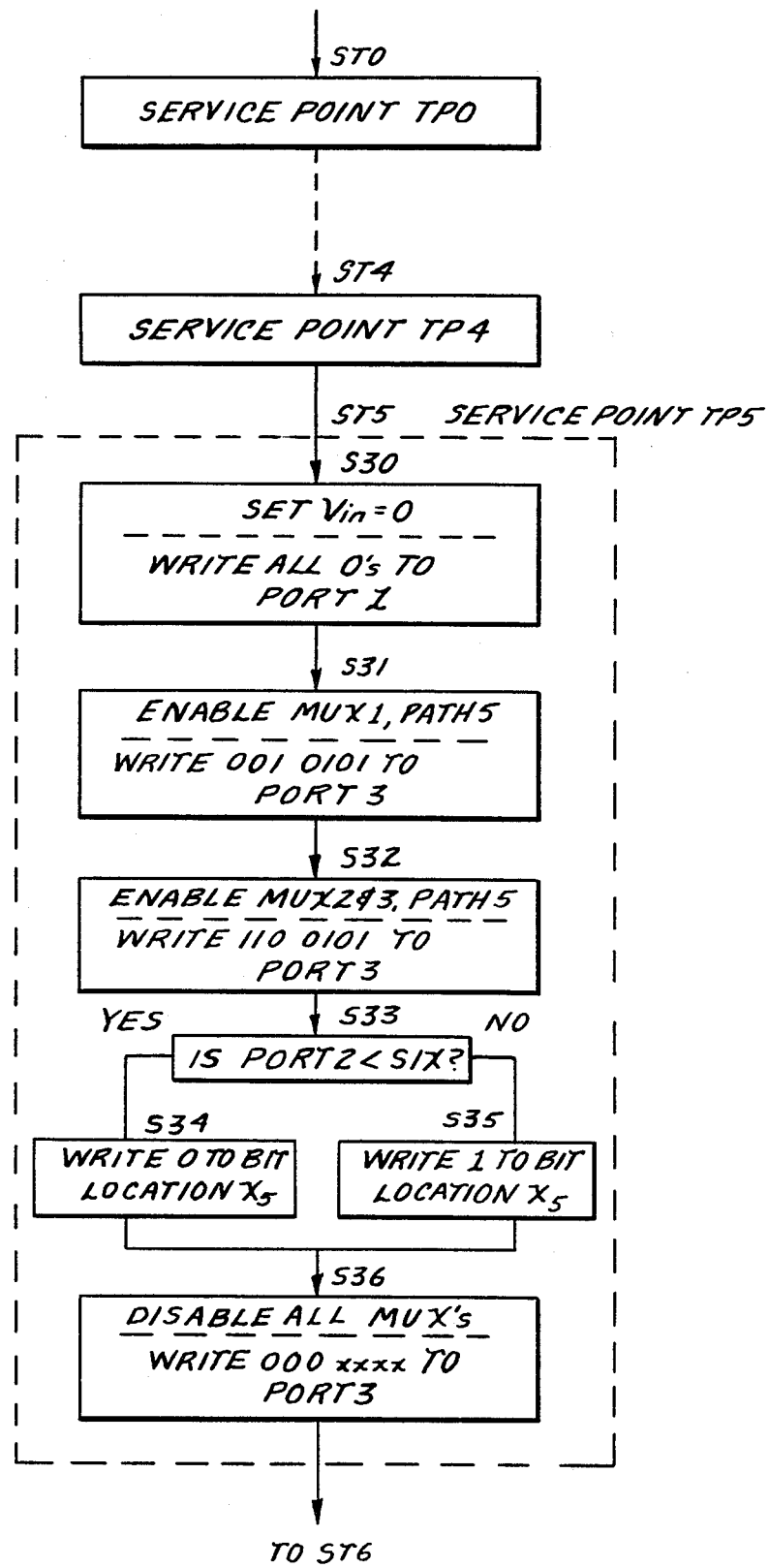

The flow chart of FIG. 11 shows an example of the edited module for point TP5 when the connected device is of Class IV and passive, as in FIG. 6. Steps S30 and S31 are the same as Steps S20 and S21 in FIG. 10; they result in the voltage $V_{in}$ being set to zero so the diode 51 will be reverse biased. Step 32 in FIG. 11 is the same as Step S22 in FIG. 10. Here, the voltage $V_e$ in FIG. 6 will thus become high (e.g. 10 to 12 volts) or low (essentially 0 volts) if the contacts 80a are open or closed. This will be signaled in binary form as a numerical value in PORT 2, when such voltage is transmitted via MUX2 to the input of ADC 40. At Step S33, the computer performs a comparison to determine if the PORT 2 contents are numerically less or greater than some preselected mid-range decimal value, e.g., six. If the former is found, the execution proceeds to Step S34 (and ignores Step S35); if the latter is found, the execution proceeds to Step S35 (and ignores Step S34). In Step S34 or S35, the computer writes a 0 or a 1, respectively, to the predetermined memory bit location $X_5$—so that it will contain a 0 or a 1 if the contacts 80a are then open or closed. Step S36 is the same as Step S3 in FIG. 8 and simply disables all MUX's so scanning for the next terminal point TP6 may begin.

If the Class IV device is "active", as in FIG. 6a, the programming for point TP5 will be the same as shown by FIG. 11, except that at Step S32 only the MUX2 will be enabled (by writing 010 0101 to PORT 3). Thus, the current source CCS will not send exciting current $I_c$ to the external device 85.

It may now be seen that the interfacing apparatus of the present invention makes it possible for each one of many terminal points to be associated with any chosen one of the four classes of external devices (and, indeed, either passive or active Class III and IV devices). Yet the need for and the cost of a separately controlled gate, such as FET 87 in FIG. 7, are totally eliminated. Once an election has been made as to the particular class of external device which will be connected to a given terminal point, it is a simple matter to edit the scanning program subroutine module so that it conforms in functional substance to the corresponding one of the instruction sequences set out in FIGS. 8, 9, 10 and 11. Complete flexibility but with a significant cost reduction is thus realized.

As mentioned with reference to FIG. 1, the several terminal points TP0 through TP15 are desirably mounted physically on a circuit board or insulating strip 23 which is adapted to be "plugged into" the interface board 21. The several prongs 24 carried by the strip form a multi-path separable connector adapted to physically engage one edge of the board 21 to make electrical connections with correspondingly located metal elements or conductive ribbons.

Applicants have found that the physical organization of the separable electrical connectors can be arranged to drastically reduce errors which may be created in the output voltage $V_o$ (see FIG. 3) when a Class I device is connected to any terminal point, such errors arising from the usually small but inevitably present contact resistance between two separable connector elements. FIGS. 15 and 16 show the normal or obvious manner of making the separable connector associated with a typical terminal point (here TP5) so as to create the circuit organization which appears in the schematic diagram of FIG. 3. The lug screw for point TP5 is threaded into a tapped flange 90a extending at right angles from a bifurcated metal plate or strip 90 formed with spring fingers 90b, 90c. The plate 90 is physically carried in the insulation strip 23 (FIG. 1) which is not shown in FIG. 15, and it is thus adapted—along with the identical plates for the other terminal points—to be pushed over the edge of interface board 21 such that its two fingers 90b, 90c make two-point spring-biased, gripping contact with a single conductive metal ribbon 91 which has, in known fashion, been deposited on the circuit board surface. The ribbon 91 "wraps around" the edge of the circuit board 21 or is formed as upper and lower surface portions joined electrically by a hole plated through with the conductive metal.

The dual fingers 90b and 90c thus provide an electrically conductive path via the unitary ribbon 91 from TP5 to (a) the downstream (cathode) end of the diode 51, (b) the inverting input 50b of the operational amplifier, (c) the input $Q_5$ of MUX2, and (d) the output $Q_5$ of MUX 3. See FIG. 15. This is a four-connection common node 92 (FIG. 17) but it inevitably includes the contact resistance, represented by $R_c$, in series between that node and the external device shown as a load 94 having an input impedance or resistance $R_L$.

When the operational amplifier 50 receives a voltage $V_{in}$ from the DAC 38 as a source, it acts to make the voltage at node 92 (FIG. 17) essentially equal to $V_{in}$. But the load current iL which passes through the load resistance $R_L$ also flows through the resistance $R_c$ which exists at the contact areas of 90b, 91 and 90c, 91 of the separable connector. This creates a voltage drop $V_c$ (FIG. 17) which causes an inaccuracy. The voltage $V_o$ is equal essentially to $V_{in} - R_c i_L$, whereas for desired and precise operation $V_o$ should be exactly equal to $V_{in}$. As $V_{in}$ takes on higher values within its normal operation range, or when the input impedance $R_L$ is in the low region of a permissible range, then the error $R_c i_L$ becomes significant, and this is aggravated if the contact resistance $R_c$ (always present) is higher than that created by perfectly mating parts with low resistance engagement.

In accordance with the present invention, such inaccuracy in correspondence between the output voltage $V_o$ and the input voltage $V_{in}$ is reduced by several orders of magnitude by providing two separate circuit paths leading to the terminal point TP5, as next to be described with reference to FIGS. 12–14. For transferring the voltage signal $V_{in}$ from a source (such as the DAC 38 in FIGS. 2 and 3, represented schematically as a variable battery 38" in FIG. 14) to a load 94 via a pull-apart connector, the input signal is applied to the non-inverting input 50a of the high-gain, summing amplifier 50. The pull-apart connector is "dual" in the sense that it includes first and second output members constituted by the spring fingers 90b, 90c on the plate 90—those members being joined electrically via the plate directly to the point TP5 and thus to the input 94a of the load 94. The dual connector also includes first and second input members adapted to be physically engaged by the respective output members; the first input member is formed by a conductive ribbon 100 extending to the upper surface edge of the interface board 21, while the second input member is formed by a separate conductive ribbon 101 which passes through the board 21 and extends to the lower surface edge. As made clear by FIGS. 12 and 13, the output members 90b, 90c separably grip to and make electrical contact with the input members or ribbons 100, 101. But the ribbon 100 constitutes an electrical connection or coupling from point TP5 to the inverting input 50b of amplifier 50 (as well as to the $Q_5$ terminal of MUX3). The other ribbon 101 forms an independent electrical coupling from the output of the amplifier 50 to point TP5 and the load input 94a (and to the $Q_5$ terminal of MUX2). Specifically in the arrangement shown, the latter coupling includes the series diode 51.

As noted above, the physical contacts at 90b, 100 and 90c, 101 inevitably create contact resistances; these are represented schematically as R1 and R2 in the equivalent schematic circuit diagram of FIG. 14. The external load or device 94 in FIGS. 12-14 is connected to TP5 by a spade lug 102 on a wire 103 which leads directly to the input 94a. One may thus see that the terminal point and the load input 94a are connected via resistance R1 to the inverting input 50b of the amplifier 50 to form a feedback loop. But the output 50c of the amplifier is connected via the diode 51 and the resistance R2 to the terminal point TP5 and the load input 94a. The terminal point TP5 is connected to the inverting input 50b and the amplifier output diode 51 through two separate resistances R1 and R2, rather than through a common single resistance $R_c$ as in the arrangement of FIGS. 15-17.

In consequence, the load current $i_L$ flows only through the resistance R2 in FIG. 14, as contrasted to the resistance $R_c$ in FIG. 17. Further, the feedback signal to inverting terminal 50b is taken from the downstream side of resistance R2 in FIG. 14, as contrasted to being taken from the cathode of diode 51 and the upstream side of resistance $R_c$ in FIG. 17. The differences are subtle but result in significant and advantageous operational performance as next to be explained.

Although contact resistance at a single metal-to-metal engagement area may typically be small and less than 0.1 ohms, it will be assumed merely for ease of comparative discussion that each contact resistance is 100 ohms. The magnitude of the resistance is not important to show a direct comparison of FIGS. 12-14 with FIGS. 15-17, and by assuming a large resistance value the arithmetic is more manageable. Thus the contact resistances at 90b, 91 and at 90c, 91 (FIG. 16) as well as the resistances at 90b, 100 and at 90c, 101 (FIG. 13) will all be assumed as equal to 100 ohms. Because in FIGS. 15 and 16, two 100 ohm resistances are in parallel between TP5 and 91, the value of $R_c$ in FIG. 17 is 50 ohms. And, on the stated assumption, the values of R1 and R2 in FIG. 14 are each 50 ohms.

To first consider FIG. 17, the operational amplifier 50 is conventionally viewed as an equivalent voltage generator (connected between ground and 50c) which produces a voltage $G \times V$, where V is the potential difference between inputs 50a and 50b, and G is the open loop gain of the amplifier. One may therefore write two Kirchoff equations for the two loops which both include the resistance $R_c$ and the load $R_L$ as common series elements but which respectively include (a) the GV voltage generator and (b) the amplifier input terminals. Thus, one may write for the second loop:

$$-V_{in} + V + V_c + V_o = 0 \tag{1}$$

$$V = V_{in} - V_c - V_o \tag{1a}$$

where $V_c$ is the drop across $R_c$ and equal to $i_L R_c$. The first loop equation is also apparent:

$$-GV + V_f + V_c + V_o = 0 \tag{2}$$

where $V_f$ is the constant "threshold" voltage drop across the diode 51 when load current $i_L$ of any finite magnitude is flowing.

Substituting Eq. (1a) into (2) yields:

$$-(V_{in} - V_c - V_o) + \frac{V_f}{G} + \frac{V_c}{G} + \frac{V_o}{G} = 0 \tag{3}$$

And by re-arranging:

$$V_o = V_{in} - V_c \frac{V_f}{G} - \frac{V_c}{G} - \frac{V_o}{G} \tag{4}$$

$$V_o\left(1 + \frac{1}{G}\right) = V_{in} - \left[V_c\left(1 + \frac{1}{G}\right) + \frac{V_f}{G}\right] \tag{5}$$

To show concretely, but for purposes of later comparison, the significance of Eq. (5), some specific numbers may be assumed and plugged in. It will be assumed that the constant forward diode drop is 0.6 volts; that the gain G is 10,000 (even though op. amps. with gains of 100,000 may be used); that the resistance $R_c$ is 50 ohms; and that the load current $i_L$ is 10 ma. On that basis, the voltage drop $V_c$ is $$V_c = 10 \text{ ma} \times 50 \text{ ohms} = 500 \text{ mv}. \tag{6}$$

and Eq. (5) becomes $$V_o\left(1 + \frac{1}{10,000}\right) = V_{in} - [(500 \text{ mv.})(1.001) + .06 \text{ mv}] \tag{5a}$$

$$V_o = \frac{V_{in} - [(500 \text{ mv})(1.001) + .06 \text{ mv}]}{1.0001} \tag{5b}$$

Now, the value 1.001 is so slightly greater than 1.0 that it can be treated as equal to 1.0, so Eq. (5b) may be validly simplified to $$V_o = V_{in} - 500.06 \text{ mv} \tag{5c}$$

where the 500.06 mv represents the error or inaccuracy which makes $V_o$ less than ideally and precisely equal to $V_{in}$. The 500 mv error arises because of the contact resistance $R_c$ in FIG. 17 and the 0.06 mv represents the inaccuracy (essentially negligible) contributed by the diode 51.

For comparative purposes, similar Kirchoff loop equations may be written for the schematic circuit of FIG. 14. For the first loop:

$$-V_{in} + V - V_1 + V_o = 0 \tag{1'}$$

$$V = V_{in} + V_1 - V_o \tag{1a'}$$

For the second loop:

$$-GV + V_f + V_2 + V_o = 0 \tag{2'}$$

By substitution of Eq. (1a') into (2'):

$$-(V_{in} + V_1 - V_o) + \frac{V_f}{G} + \frac{V_2}{G} + \frac{V_o}{G} = 0 \tag{3'}$$

And by re-arranging:

$$V_o = V_{in} + V_1 - \frac{V_f}{G} - \frac{V_2}{G} - \frac{V_o}{G} \tag{4'}$$

$$V_o\left(1 + \frac{1}{G}\right) = V_{in} - \left[-V_1 + \frac{V_2}{G} + \frac{V_f}{G}\right] \tag{5'}$$

To show the comparative significance of Eq. (5') in relation to Eq. (5), it will again be assumed that $G = 10,000$ and $i_L = 10$ ma., taken with the above-stated assumption that $R1 = R2 = 100$ ohms. Further, it may be validly assumed that the current $i_b$ flowing through the resistance R1 and into the inverting input terminal 50b is very low and specifically 0.5 microamperes. This is quite realistic for a high input impedance operational amplifier. The voltage drops $V_1$ and $V_2$ across the separate contact resistances therefore are $$V_1 = 0.5 \ \mu\text{ua} \times 100 \text{ ohms} = 50 \ \mu\text{v} \tag{6a'}$$

$$V_2 = 10 \text{ ma} \times 100 \text{ ohms} = 1.0 \text{ volt} \tag{6b'}$$

Thus, the numerical values for Eq. (5') may be written:

$$V_o\left(1 + \frac{1}{10,000}\right) = V_{in} - \left[-50\mu\text{v} + \frac{1.0}{10,000} + \frac{.6}{10,000}\right] \tag{5a'}$$

$$V_o = \frac{V_{in} - [-50\mu\text{v} + 0.1 \text{ mv} + 60\mu\text{v}]}{1.0001} \tag{5b'}$$

In the foregoing expression, the denominator is so close to 1.00 as to be taken as 1.0. Thus, the expression validly may be viewed as $$V_o = V_n - 0.11 \text{ mv} \tag{5c'}$$

The term $-0.11$ mv represents the error or inaccuracy which makes $V_o$ less than ideally and precisely equal to $V_{in}$. Only 0.1 mv error arises because of the contact resistance R2; virtually no error arises due to the presence of the contact resistance R1; and indeed the voltage $V_1 = 5 \ \mu\text{v}$ in part cancels the error which would be created because of the forward voltage drop across the diode 51.

The comparison of FIG. 17 to FIG. 14 based upon the same assumed values and the numbers from Eqs. (5c) and (5c') shows that in the first case the error is 500.06 mv. but in the second case (with the dual-contact separable connector involving the two members or ribbons 100, 101 rather tan a single member or ribbon 91) the error is only 0.11 mv. It is amazing to see that the error (whatever its magnitude) is reduced by a factor of $$\frac{500.06}{0.11} \approx 4,546$$

In other words, the improved dual contact and circuit connection arrangement will reduce contact resistance voltage drop errors in the output voltage $V_o$ by a factor of about 4000. Of course, the errors will not be as great in actual magnitude when the contact resistances are on the order of 0.1 ohms rather than the assumed value of 100 ohms; but the fact remains that whatever the contact resistances happen to be, the arrangement of FIGS. 12–14 will result in errors greatly less than those of the arrangement in FIGS. 15–17.

It is interesting to observe also, that if the open loop gain G is actually about 100,000 (rather than the assumed 10,000) then the adverse influence of the diode 51 is really wholly removed; that is, as indicated by Eq. (5') and (5a'), the forward drop $V_f$ produces a subtractive term of $V_f/G$ and this becomes $0.6/100,000 = 0.006$ mv in Eq. (5b'). The fact that the negative feedback connection is taken from TP5 downstream of the diode 51 results, in both FIGS. 14 and 17, in the subtractive terms $V_f$ being divided by the high open-loop gain G, so $V_d/G$ becomes negligible.

In the arrangement of FIG. 14, the series resistance R2 carries the load current $i_L$ and results in a voltage drop $V_2$. But the adverse effect of that drop $V_2$ is essentially removed because, as Eq. (5') shows, the subtractive term is $V_2$ divided by the high open loop gain G, so that $V_2/G$ is indeed quite small. This results from the fact that the feedback connection is taken from TP5 (via R1) and thus downstream of the resistance R2. That advantage is not obtained in FIG. 17 where load current iL flows through the contact resistance $R_c$ and the subtractive term is the entire voltage $V_c$ undiminished by the gain factor G (see Eq. 5).

Indeed, the dual contact separable connector, with two independent electrical connections 101, 100 (a) from the amplifier output and (b) to the inverting input makes it possible to provide short circuit protection for the amplifier 50 (FIG. 14). One may elect to connect a protective resistor $R_p$ (not shown) in series with the diode 51 so that, in schematic FIG. 14, it adds to and becomes a part of R2—thereby increasing the nominal value of 0.1 ohms for R2 up to about 300 ohms. Then, if the input to the load 94 inadvertently becomes short circuited and the amplifier thus is driven to saturated or maximum output, the short circuit current will be safely limited to about 25 ma. Yet, when operation is normal and the load current is 10 ma., the voltage drop $V_2$ would ordinarily be 8.0 volts. But the subtractive term $V_2/G$ in Eq. (5') with an amplifier having $G = 100,000$, will be only $3/100,000 = 0.3$ mv and will not result in an intolerable discrepancy between $V_{in}$ and $V_o$. Therefore, one may provide for short circuit protection at the sacrifice of incurring only very slight additional inaccuracy in the output voltage $V_o$.

The present invention thus brings to the art simple interface circuitry which makes any one of a plurality of terminal points truly universal, and adaptable by quick editing of the cooperating software to any class of external device, with a major reduction in cost. By further adopting the separate, dual contacts for each of the separable connectors, the adverse effect of contact resistances is drastically reduced and, for practical purposes, eliminated.

We claim:
1. In a computer system having
    (a) a computer which includes a CPU with conventional multibit memory, data bus, address bus and ports,
    (b) a terminal point through which intelligence is transferred either from the computer to an external device or from an external device into the computer, said system being characterized in that the external device associated with said terminal point may be either one of two categories, namely

First Category: a device to which a changeable dc. voltage is to be outputted with a magnitude that depends on the changeable contents in a preselected memory location $ML_1$ in the computer, or Second Category: a device which feeds to said terminal point a changeable dc. voltage whose magnitude is to be represented by setting the numerical contents of a predetermined memory location $ML_2$;

and said system including, in combination (c) a DAC adapted to receive multbit input signals and having an analog voltage output terminal, (d) means constituting an ADC having an input terminal adapted to receive a voltage signal appearing at said terminal point, (e) a sample-and-hold voltage summing amplifier having non-inverting and inverting input terminals and an output terminal, (f) means connecting said DAC analog output terminal to said non-inverting input terminal, (g) means including a forwardly poled diode connecting said amplifier output terminal to said terminal point, (h) means connecting said terminal point to said inverting input terminal to create a negative feedback loop, and (i) means formed in part by said computer and a program of sequential instructions loaded therein (1) for iteratively writing out from the computer to said DAC multibit signals which represent the changeable intelligence stored at said preselected memory location $ML_1$, when said device is of the First Category; or (2) for writing out from the computer to said DAC multibit signal numerically representing substantially zero, and iteratively writing from said ADC into said predetermined memory location $ML_2$ signals which correspond in intelligence to the changeable dc. voltage existing at said terminal point and the ADC input terminal, when said device is of the Second Category; said diode being reverse biased automatically when intelligence is taken from a Second Category external device through said terminal point and into the computer memory.

2. In a computer system having (a) a computer which includes a CPU with conventional multibit memory, data, bus, address bus and ports, and (b) a terminal point through which intelligence is transferred either from the computer to an external device or from an external device into the computer, said system being characterized in that the external device associated with said terminal point may be any one of four classes, namely Class I: a device to which a variable analog voltage is to be outputted, such voltage corresponding in magnitude to the changeable numerical value of a preselected memory word W in the computer, Class II: a device to which a high/low bistate voltage is to be outputted corresponding to the bistate 1 or 0 value of a predetermined memory bit location B in the computer, Class III: a device which inputs to said terminal point a variable analog voltage whose magnitude is to be represented digitally in a predetermined memory word U of the computer, or Class IV: a device which inputs to said point a bistate voltage whose high or low state is to be represented digitally by a 1 or 0 stored in a predetermined memory bit location X in the computer;

and said system including, in combination (c) a DAC adapted to receive multibit input signals, said DAC having an analog voltage output terminal, (d) means constituting an ADC having an input terminal adapted to receive a voltage signal appearing at said terminal point, (e) a sample-and-hold voltage summing amplifier having non-inverting and inverting input terminals and an amplifier output terminal, (f) means connecting said DAC analog voltage output terminal to said non-inverting input terminal, (g) means including a forwardly poled diode connecting said amplifier output terminal to said terminal point, (h) means connecting said terminal point to said inverting input terminal to create a negative feedback loop, and (i) means formed in part by said computer and a program of sequential steps loaded therein (1) for iteratively reading out from the computer to said DAC multibit signals corresponding to the contents of the memory word W, when said device is of Class I;

(2) to iteratively reading out from the computer to said DAC multibit signals representing predetermined high and low numerical values depending upon whether the content of said bit location B is 1 or 0, when said device is of Class II;

(3) for iteratively reading out from the computer to said DAC multibit signals numerically representing substantially zero, and writing into said memory word U the multibit signals of said ADC, when said device is of Class III; or (4) for iteratively reading out from the computer, to said DAC, multibit signals numerically representing substantially zero, and writing into said memory bit location X a 1 or 0 depending upon whether the multibit output of said ADC is above or below a predetermined numerical value, when said deviced is of Class IV, said diode being reverse biased automatically when intelligence is taken from a Class III or Class IV external device through said terminal point and into the computer.

3. The system defined by claim 2 wherein said connecting means (h) includes a first pair of separable connector elements creating a first contact resistance R1, said connecting means (g) includes a second pair of separable connector elements creating a second contact resistance R2, and one element of the first pair and one element of the second pair are directly connected to said terminal point, whereby feedback to said non-inverting terminal is taken through said second resistance from said terminal point downstream of said diode and said second resistance.

4. In a computer system having (a) a computer which includes a CPU with conventional multibit memory, data bus, address bus and ports, (b) a terminal point through which intelligence is transferred either from the computer to an external device or from an external device into the computer, said system being characterized in that the external device associated with said terminal point may be any one of four classes, namely Class I: a device connected to such point to respond to a variable analog voltage whose magnitude corresponds to the changeable digitally-represented, numerical value in a predetermined memory word W of the computer, Class II: a device connected to such point to respond to a high/low bistate voltage whose level corresponds to the bi-state 1 or 0 value in a predetermined memory bit location B of the computer, Class III: a device connected to apply to such point a variable analog voltage whose magnitude is to be represented digitally and numerically in a predetermined memory word U of the computer, or Class IV: a device connected to apply to such point a bi-state voltage whose high or low level is to be stored digitally by a 1 or 0 value in a predetermined memory bit location X of the computer, and said system including, in combination, (c) a DAC coupled to receive multibit input signals from an output port of the computer, said DAC having an analog voltage output terminal, (d) an ADC coupled to receive on its input terminal any voltage applied to said terminal point, said ADC having a multibit output, (e) a sample-and-hold voltage follower having its input connected to said DAC output terminal, an having its output connected through a forwardly poled diode to said terminal point, and having a negative feedback connection from the terminal point, and (f) means formed in part by said computer and a program of sequential steps loaded therein (i) for iteratively writing the contents of said word W from computer memory to said output port when said device is of Class I;

(ii) for iteratively writing multibit signals to said output port with predetermined high and low numerical values when the content of said bit location B is 1 or 0, respectively and said device is of Class II, (iii) for iteratively writing multibit input signals numerically representing substantially zero to said output port and writing the signals from said ADC to said word location U in the computer, when said device is of Class III, or (iv) for iteratively writing multibit input signals numerically representing substantially zero to said output port, and writing into said memory bit location X a 1 or a 0 depending upon whether the signals from said ADC are above or below a predetermined numerical value, when said device is of Class IV, said diode being reverse biased automatically when intelligence is taken from a Class III or Class IV external device through said terminal point and into the computer.

5. The system defined by claim 4 wherein said voltage follower is a summing operational amplifier having non-inverting and inverting input terminals, the former being connected to said DAC output, and said system being further characterized by and including a first pair of separable connector elements connecting said terminal point to said inverting input, and a second pair of separable connector elements connecting the downstream end of said diode to said terminal point.

* * * * *